US 12,487,694 B2

(12) United States Patent
Choi et al.

(10) Patent No.: US 12,487,694 B2
(45) Date of Patent: Dec. 2, 2025

(54) ELECTRONIC DEVICE AND METHOD FOR IDENTIFYING POSITION RELATIONSHIP BETWEEN DISPLAY AND PORTION OF BODY OF USER

(71) Applicant: SAMSUNG ELECTRONICS CO., LTD., Suwon-si (KR)

(72) Inventors: Gwangho Choi, Suwon-si (KR); Jongah Kim, Suwon-si (KR); Heewoong Yoon, Suwon-si (KR); Kihyuk Lee, Suwon-si (KR); Donghan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/818,083

(22) Filed: Aug. 28, 2024

(65) Prior Publication Data

US 2025/0173017 A1    May 29, 2025

Related U.S. Application Data

(63) Continuation of application No. PCT/KR2024/012550, filed on Aug. 22, 2024.

(30) Foreign Application Priority Data

Nov. 29, 2023   (KR) ........................ 10-2023-0170217
Dec. 28, 2023   (KR) ........................ 10-2023-0195830

(51) Int. Cl.
  *G06F 3/041*   (2006.01)
  *G06F 3/01*   (2006.01)
(52) U.S. Cl.
  CPC .......... *G06F 3/04162* (2019.05); *G06F 3/014* (2013.01); *G06F 3/017* (2013.01); *G06F 3/04164* (2019.05)

(58) Field of Classification Search
  CPC ...... G06F 3/04162; G06F 3/014; G06F 3/017; G06F 3/04164
  See application file for complete search history.

(56) References Cited

U.S. PATENT DOCUMENTS 9,342,162 B2    5/2016  Song et al.
10,606,356 B2 *  3/2020  Levesque .............. G06F 1/1637
(Continued)

FOREIGN PATENT DOCUMENTS

JP    2012-503244 A    2/2012
KR    20160016429 A    2/2016
(Continued)

OTHER PUBLICATIONS

International Search Report issued Dec. 2, 2024 by the International Searching Authority in International Application No. PCT/KR2024/012550.

(Continued)

*Primary Examiner* — Jonathan A Boyd
(74) *Attorney, Agent, or Firm* — Sughrue Mion, PLLC

(57) ABSTRACT

According to an embodiment, an electronic device includes a display including an electromagnetic inductive circuit and a touch screen panel, memory storing instructions, and a processor. The instructions, when being executed by the processor, cause the electronic device to identify a first position on the display, where the portion of the body of a user is contacted, and identify a second position of a wearable device worn on the portion of the body, with respect to the display. The instructions, when being executed by the processor, cause the electronic device to identify a position relationship between the display and the portion of the body. The instructions, when being executed by the processor, cause the electronic device to identify that a position of the portion of the body which is in contact with the display is changed from the first position to a third (Continued)

position. The instructions, when being executed by the processor, cause the electronic device to change a screen displayed on the display.

20 Claims, 23 Drawing Sheets

(56) References Cited

U.S. PATENT DOCUMENTS

| | | |
|---|---|---|
| 2015/0062086 A1 | 3/2015 | Nattukallingal |
| 2015/0241976 A1* | 8/2015 | Zhao .................. G06F 3/017 345/158 |
| 2015/0338916 A1* | 11/2015 | Priyantha ............ G06F 1/1698 345/173 |
| 2016/0077587 A1* | 3/2016 | Kienzle ................ G06F 3/033 345/156 |
| 2016/0299606 A1 | 10/2016 | Go |
| 2020/0241641 A1 | 7/2020 | Vescovi et al. |
| 2022/0137746 A1 | 5/2022 | Lim et al. |

FOREIGN PATENT DOCUMENTS

| | | |
|---|---|---|
| KR | 101617829 B1 | 5/2016 |
| KR | 101997450 B1 | 7/2019 |
| KR | 20210012838 A | 2/2021 |
| KR | 10-2023-0040052 A | 3/2023 |
| KR | 20150003694 A | 1/2025 |
| WO | WO-2010032223 A1 * | 3/2010 ............. G06F 3/014 |

OTHER PUBLICATIONS

Written Opinion issued Dec. 2, 2024 by the International Searching Authority in International Application No. PCT/KR2024/012550.

* cited by examiner

ELECTRONIC DEVICE AND METHOD FOR IDENTIFYING POSITION RELATIONSHIP BETWEEN DISPLAY AND PORTION OF BODY OF USER

CROSS-REFERENCE TO RELATED APPLICATIONS

This application is a by-pass continuation application of International Application No. PCT/KR2024/012550, filed on Aug. 22, 2024, which is based on and claims priority to Korean Patent Application Nos. 10-2023-0170217, filed on Nov. 29, 2023, and 10-2023-0195830, filed on Dec. 28, 2023, in the Korean Intellectual Property Office, the disclosures of which are incorporated by reference herein their entireties.

BACKGROUND

1. Field

The disclosure relates to an electronic device and a method for identifying a position relationship (e.g., an angle, a distance, a position) between a display and a portion of a body of a user.

2. Description of Related Art

An electronic device may display an object through a movement of a portion of a body of a user and/or a digital pen, on a display. The electronic device may display a visual object through the display, according to the movement of the portion of the body of the user and/or the digital pen. The electronic device may provide writing experience to the user by displaying the visual object through the display, according to the movement of the portion of the body of the user and/or the digital pen.

The above-described information may be provided as a related art for the purpose of helping to understand the disclosure. No claim or determination is raised as to whether any of the above-described information may be applied as a prior art related to the disclosure.

SUMMARY

According to an embodiment, an electronic device may comprise a display comprising an electromagnetic inductive circuit and a touch screen panel, memory storing instructions, and a processor. The instructions, when being executed by the processor, may cause the electronic device to, based on identifying that a portion of a body of a user is in contact with the display, identify a first position on the display, where the portion of the body is contacted, and identify a second position of a wearable device worn on the portion of the body, with respect to the display. The instructions, when being executed by the processor, may cause the electronic device to, based on the first position and the second position, identify a position relationship between the display and the portion of the body. The instructions, when being executed by the processor, may cause the electronic device to identify that a position of the portion of the body which is in contact with the display is changed from the first position to a third position, according to a movement of the portion of the body with respect to the electronic device. The instructions, when being executed by the processor, may cause the electronic device to, based on the position relationship and the third position changed from the first position, change a screen displayed on the display.

According to an embodiment, a method of an electronic device may comprise, based on identifying that a portion of a body of a user is in contact with the display, identifying a first position on the display, where the portion of the body is contacted, and identifying a second position of a wearable device worn on the portion of the body, with respect to the display. The method may comprise, based on the first position and second position, identifying a position relationship between the display and the portion of the body. The method may comprise identifying that a position of the portion of the body which is in contact with the display is changed from the first position to a third position, according to a movement of the portion of the body with respect to the electronic device. The method may comprise, based on the position relationship and the third position changed from the first position, changing a screen displayed on the display.

According to an embodiment, a non-transitory computer readable storage medium may store one or more programs. The one or more programs may comprise instructions, which, when being executed by a processor of an electronic device including a display comprising an electromagnetic inductive circuit and a touch screen panel, cause the electronic device to, based on identifying that a portion of a body of a user is in contact with the display, identify a first position on the display, where the portion of the body is contacted, and identify a second position of a wearable device worn on the portion of the body, with respect to the display. The one or more programs may comprise instructions, which, when being executed by a processor, cause the electronic device to, based on the first position and second position, identify a position relationship between the display and the portion of the body. The one or more programs may comprise instructions, which, when being executed by a processor, cause the electronic device to identify that a position of the portion of the body which is in contact with the display is changed from the first position to a third position, according to a movement of the portion of the body with respect to the electronic device. The one or more programs may comprise instructions, which, when being executed by a processor, cause the electronic device to, based on the position relationship and the third position changed from the first position, change a screen displayed on the display.

According to an embodiment, an electronic device may comprise a first housing, a second housing, a hinge structure rotatably coupling the first housing to the second housing with respect to a folding axis, a flexible display including a first display area corresponding to one side of the first housing and a second display area corresponding to one side of the second housing divided based on the folding axis, and including at least one of an electromagnetic inductive circuit and touch screen panel, memory storing instructions, and a processor. The instructions, when being executed by the processor, may cause the electronic device to identify an approach of a portion of a body of a user and a wearable device worn on the portion of the body while an angle between a direction in which the first display area faces and a direction in which the second display area faces is within a designated range. The instructions, when being executed by the processor, may cause the electronic device to identify a first position of the portion of the body and a second position of the wearable device with respect to the display. The instructions, when being executed by the processor, may cause the electronic device to, based on the first position and the second position, identify a position relationship between one display area of the first display area and the second display area, and the portion of the body. The instructions, when being executed by the processor, may cause the electronic device to identify that the position of the portion of the body changes from the first position to a third position according to a movement of the portion of the body with respect to the electronic device. The instructions, when being executed by the processor, may cause the electronic device to, based on the position relationship and the third position changed from the first position, transmit information for displaying an object in a space configured based on the first display area and the second display area to another wearable device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
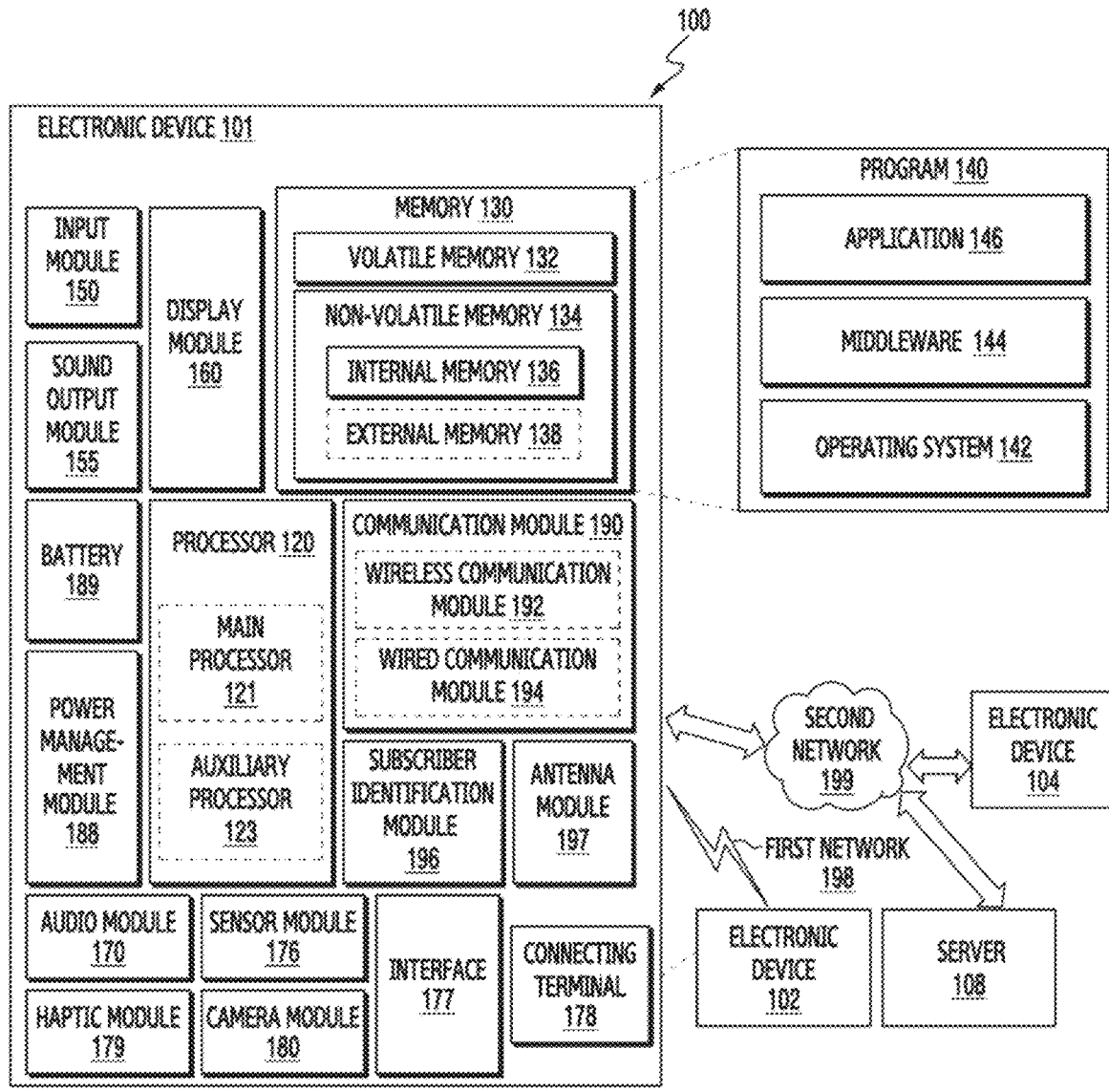
FIG. 1 is a block diagram of an electronic device in a network environment.

Hereinafter, an embodiment of the disclosure will be described in detail with reference to the drawings, so that those skilled in the art may easily implement the present invention. However, the disclosure may be implemented in various different forms and is not limited to the embodiment described herein. With respect to the description of the drawings, the same or similar reference numerals may be used for the same or similar components. In addition, in the drawings and related descriptions, descriptions of well-known functions and configurations may be omitted for clarity and conciseness.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, the electronic device 101 may identify a touch input through a portion of a body (e.g., a finger) of a user. The electronic device 101 may identify a position relationship between a display and the portion of the body of the user. The electronic device 101 may use a wearable device worn on the portion of the body of the user, in order to identify an accurate position relationship between the display and the portion of the body of the user. The electronic device 101 may identify the position relationship between the display and the portion of the body of the user, based on identifying a position where the touch is inputted and a position of the wearable device with respect to the display of the electronic device 101. The electronic device 101 may change a screen displayed on the display, based on the position relationship between the display and the portion of the body of the user. In the following description, a technical feature for identifying a position relationship between a display and a portion of a body of a user, based on the identified position relationship, and changing a screen displayed on the display will be described.

Figure 2:
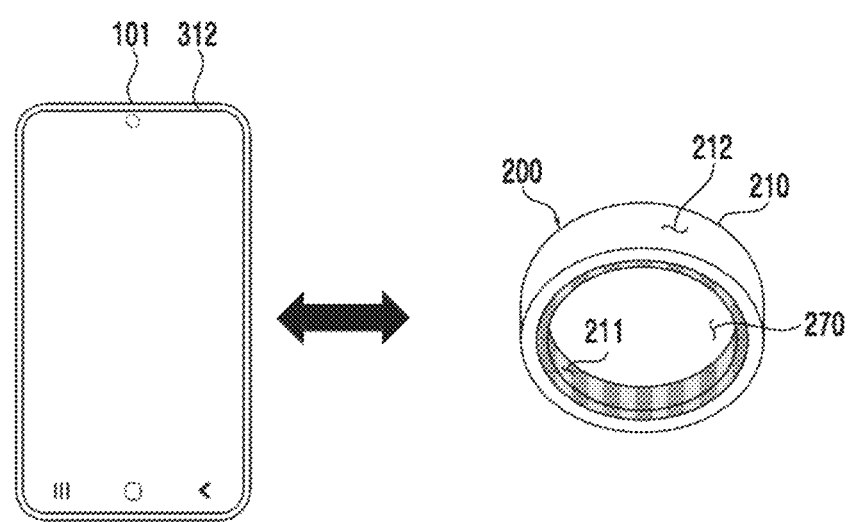
FIG. 2 illustrates an example of an electronic device and a wearable device.

FIG. 2 illustrates an example of an electronic device and a wearable device.

Referring to FIG. 2, the electronic device 101 may correspond to the electronic device 101 of FIG. 1. The electronic device 101 may include a display 312. In some embodiments, the electronic device may be a smart phone.

According to an embodiment, the electronic device 101 may identify a touch input through a portion of a body (e.g., a finger) of a user through the display 312. Based on the touch input, the electronic device 101 may change a screen displayed through the display 312. For example, the electronic device 101 may change an object displayed on the screen, based on identifying that the touch input is changed according to a movement of the portion of the body of the user.

For example, the electronic device 101 may identify a position relationship between the display 312 and the portion of the body of the user. In some embodiments, the position relationship may correspond to a distance between the display 312 and the portion of the body of the user (e.g., the fourth finger of the user's left hand wearing a wearable device 200). In some embodiments, the position relationship may correspond to an angle of the wearable device 200 (worn by the user) with respect to the display 312 of the electronic device 101. Based on the identified position relationship, the electronic device 101 may change the displayed object (or a thickness of the object) according to a movement of the touch input.

According to an embodiment, the electronic device 101 may establish a connection with the wearable device 200. The wearable device 200 may be configured to be wearable on a portion of a body (e.g., a finger) of a user. For example, the wearable device 200 may be worn on the portion of the body of the user. For example, the wearable device 200 may be fastened to the portion of the body of the user. For example, the wearable device 200 may be detachable with respect to the portion of the body of the user. For example, the wearable device 200 may have a shape corresponding to the portion of the body of the user, in order to be worn on the portion of the body of the user. In some embodiments, the wearable device 200 may correspond to a ring.

For example, the wearable device 200 may be in contact with the portion of the body of the user by being worn on the user. For example, the wearable device 200 may be configured to obtain information on the user through the portion of the body of the user by being worn on the user. As a non-limiting example, the wearable device 200 may provide information on the user through the wearable device 200 and/or the electronic device 101 connected to the wearable device 200.

According to an embodiment, the wearable device 200 may include a housing 210 including a first surface 211 facing the portion of the body (e.g., a finger) of the user and a second surface 212 opposite to the first surface 211. For example, the wearable device 200 may include a ring-shaped housing 210. For example, the wearable device 200 may be configured in a ring shape. FIG. 2 illustrates an example in which the shape of the wearable device 200 is configured in a ring shape. In some embodiments, the shape and a form of the wearable device 200 may include other shapes (e.g., square, elliptical, etc.) that may be worn on a portion of a body (e.g., finger, wrist, and earlobe) of a user.

According to an embodiment, at least a portion of the first surface 211 may contact the portion of the body of the user, when the wearable device 200 is worn by the user. For example, the first surface 211 may surround the portion of the body of the user on which the wearable device 200 is worn. For example, the first surface 211 may cover the portion of the body of the user on which the wearable device 200 is worn. For example, as the first surface 211 pressurizes the portion of the body of the user when the wearable device 200 is worn on the user, the wearable device 200 may be configured to be fastened to the portion of the body of the user. For example, the first surface 211 may be deformable by the portion of the body of the user. For example, the wearable device 200 may provide information on the user through the first surface 211 based on haptic technology.

For example, the second surface 212 may form or correspond to the exterior of the wearable device 200 together with the first surface 211. For example, the second surface 212 may form or correspond to the ring-shaped housing 210 together with the first surface 211. For example, the second surface 212 may be a surface spaced apart from the portion of the body of the user, when the wearable device 200 is worn by the user. For example, the first surface 211 may be referred to as an 'inner circumference surface' of the housing 210. The second surface 212 opposite to the first surface 211 may be referred to as an 'outer circumference surface' of the housing 210.

For example, the second surface 212 may be exposed to the outside in a state that the wearable device 200 is worn by the user. The second surface 212 may be made of at least one of titanium, stainless steel, and ceramic. The second surface 212 may be made of a material for protecting against an external impact and/or a scratch. According to embodiments, the second surface 212 may be coated with an additional material to protect the color of the wearable device 200 and/or the exterior of the wearable device 200.

For example, the first surface 211 may be made of the same and/or a similar material as the second surface 212. According to an embodiment, at least a portion of the first surface 211 may be made of at least one of a molding material, transparent plastic, and/or a glass for obtaining data. According to an embodiment, at least a portion of the first surface 211 may be made of a metal for identifying a biometric signal.

According to an embodiment, the wearable device 200 may further include a hole 270 formed by the first surface 211 to enable the portion of the body of the user to pass through when the wearable device 200 is worn by the user. For example, in a case that the wearable device 200 is worn by the user, the hole 270 may be penetrated by the portion of the body of the user. The wearable device 200 may be configured to be fastened to the portion of the body of the user when the user wears the wearable device 200, by including the hole 270 configured to enable the portion of the body of the user to pass through.

According to an embodiment, the wearable device 200 may further include one or more components between the first surface 211 and the second surface 212. For example, the wearable device 200 may include a communication circuit, one or more sensors, and/or a processor between the first surface 211 and the second surface 212. An arrangement of the one or more components will be described later in FIGS. 4A and 4B.

For example, the wearable device 200 may be connected to the electronic device 101. For example, the wearable device 200 may be connected to the electronic device 101 using various radio access technologies (RATs) (e.g., Bluetooth™ communication, wireless LAN). For example, the wearable device 200 may control the electronic device 101 or may be controlled by the electronic device 101. For example, the wearable device 200 may receive a request for information on a user from the electronic device 101. The wearable device 200 may transmit the information on the user to the electronic device 101, based on the request received from the electronic device 101.

According to an embodiment, the electronic device 101 may identify a position of the wearable device 200 worn on the portion of the body of the user, in order to identify a position relationship between the display 312 and the portion of the body of the user. For example, a user (wearing the wearable device 200 on a finger) may provide a touch input using the finger. The electronic device 101 may identify the position where the touch input occurs and the position of the wearable device 200 with respect to the electronic device 101 (or the display 312). The electronic device 101 may identify the position relationship between the display 312 and the portion of the body of the user, based on the position where the touch input occurs and the position of the wearable device 200 with respect to the electronic device 101 (or the display 312).

The wearable device 200 described below (e.g., FIGS. 3 to 17B) is described as being configured in a ring shape. In some embodiments, the shape of the wearable device 200 may include various other shapes (e.g., square, oval, etc.) that may be worn on the portion of the body of the user (e.g., finger, wrist, and earlobe).

Figure 3:
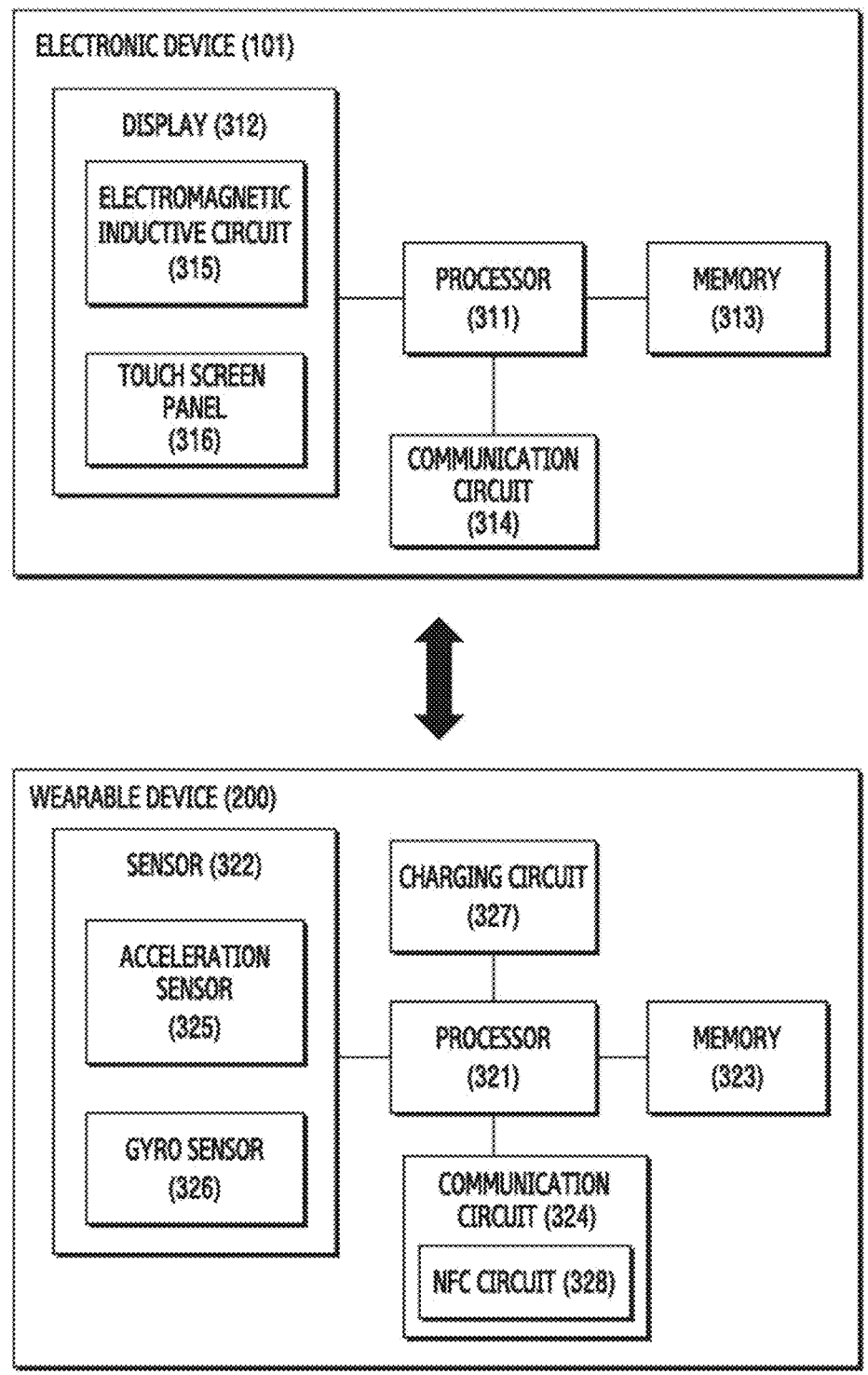
FIG. 3 illustrates an example of a block diagram of an electronic device and a wearable device.

FIG. 3 illustrates an example of a block diagram of an electronic device and a wearable device.

Referring to FIG. 3, the wearable device 200 may operate in a state which is connected to the electronic device 101. For example, the electronic device 101 may be used to control the wearable device 200. The wearable device 200 may operate in a state which being worn on a portion of a body (e.g., a finger) of a user of the electronic device 101.

According to an embodiment, the electronic device 101 may include a processor 311, the display 312, memory 313, and/or a communication circuit 314. According to an embodiment, the electronic device 101 may include at least one of the processor 311, the display 312, the memory 313, and the communication circuit 314. For example, at least a portion of the processor 311, the display 312, the memory 313, and the communication circuit 314 may be omitted according to an embodiment.

According to an embodiment, the processor 311 may correspond to the processor 120 of FIG. 1. The processor 311 may be configured to be, operatively or operably, coupled or connected with the display 312, the memory 313, and the communication circuit 314. In other words, the processor 311 may be configured to control the display 312, the memory 313, and the communication circuit 314. For example, the display 312, the memory 313, and the communication circuit 314 may be controlled by the processor 311.

Although illustrated on a basis of different blocks, the embodiment is not limited thereto, and a portion of the hardware (e.g., the processor 311, the communication circuit 314, and a portion of the memory 313 of FIG. 3) may be included in a single integrated circuit, such as a system on a chip (SoC).

According to an embodiment, the processor 311 may be configured with at least one processor (that is, one or more processors). For example, the processor 311 may include a main processor performing high-performance processing and a supplementary processor performing low-power processing.

According to an embodiment, the processor 311 may include a hardware component for processing data, based on one or more instructions. For example, the hardware component for processing data may include an arithmetic and logic unit (ALU), a field programmable gate array (FPGA), and/or a central processing unit (CPU).

For example, the processor 311 may include at least one of an application processor, a supplementary processor (e.g., a sensor hub, a microcontroller unit (MCU), a central processor unit (CPU), a neural processing unit (NPU), a graphic processing unit (GPU), and/or a processor for IoT (e.g., a processor integrated with a communication module)).

According to an embodiment, the electronic device 101 may include the display 312. The display 312 may output visualized information to the user. For example, the display 312 may be controlled by the processor 311 including a circuit such as the graphic processing unit (GPU), and may output the visualized information to the user. For example, the display 312 may correspond to the display module 160 of FIG. 1.

For example, the display 312 may include an electromagnetic inductive circuit 315 and a touch screen panel 316. For example, the electromagnetic inductive circuit 315 may be configured to receive a hovering input (or a touch input) on the display 312. The electromagnetic inductive circuit 315 may be referred to as an electromagnetic resonance (EMR) panel, an electromagnetic panel, and/or a digitizer. The electromagnetic inductive circuit 315 may be used to identify a magnetic field generated based on power being supplied to at least one circuit (e.g., coil) of an external electronic device (e.g., the wearable device 200), an electronic pen, or a stylus. The processor 311 may identify access of the external electronic device (e.g., the wearable device 200) with respect to the display 312, by using the electromagnetic inductive circuit 315.

For example, the touch screen panel 316 may be configured to detect a touch input (or a hovering input) with respect to a specific position of the display 312. For example, the touch screen panel 316 may be configured based on at least one of a capacitive method, a resistive method, an infrared method, and an ultrasonic method. For example, in a case that the touch screen panel 316 is configured based on the capacitive method, the touch screen panel 316 may be configured of a plurality of layers. The first layer of the touch screen panel 316 may include a driving electrode. The second layer of the touch screen panel 316 may include a dielectric substance. The third layer of the touch screen panel 316 may include a sensing electrode. The processor 311 may identify a touch input, based on identifying a capacitance value changing in a plurality of areas where the driving electrode and the sensing electrode cross each other.

According to an embodiment, the electronic device 101 may include the memory 313. The memory 313 may be used to store information or data. For example, the memory 313 may be used to store data received from the wearable device 200. For example, the memory 313 may correspond to the memory 130 of FIG. 1. For example, the memory 313 may be a volatile memory unit or units. For example, the memory 313 may be a non-volatile memory unit or units. For example, the memory 313 may be another type of a computer readable medium, such as a magnetic or optical disk. For example, the memory 313 may store data obtained, based on an operation (e.g., an algorithm execution operation) performed by the processor 311. According to an embodiment, the memory 313 may be configured as an integrated shape with the processor 311.

According to an embodiment, the electronic device 101 may include the communication circuit 314. The communication circuit 314 may correspond to at least a portion of the communication module 190 of FIG. 1. For example, the communication circuit 314 may be used for various radio access technologies (RATs). For example, the communication circuit 314 may be used to perform Bluetooth communication, wireless local area network (WLAN) communication, Zigbee communication, near field communication (NFC), ultra-wide band (UWB) communication, or ANT+ communication. For example, the communication circuit 314 may be used to perform cellular communication. For example, the processor 311 may establish a connection with another electronic device (e.g., the wearable device 200) through the communication circuit 314. For example, the processor 311 may identify (or measure) a position of the electronic device 101, based on a wireless signal (e.g., a global positioning system (GPS) signal) which is received or transmitted, using the communication circuit 314. According to an embodiment, the communication circuit 314 may be integrated with the processor 311.

According to an embodiment, the wearable device 200 may include a processor 321, a sensor 322, memory 323, and/or a communication circuit 324. According to an embodiment, the wearable device 200 may include at least one of the processor 321, the sensor 322, the memory 323, and the communication circuit 324. For example, at least a portion of the processor 321, the sensor 322, the memory 323, and the communication circuit 324 may be omitted according to an embodiment.

According to an embodiment, the wearable device 200 may include the processor 321. For example, the processor 321 may correspond to the processor 120 of FIG. 1. The processor 321 may be configured to be, operatively or operably, coupled or connected with the sensor 322, the memory 323, the communication circuit 324, and a charging circuit 327. In some embodiments, the processor 321 may be configured to control the sensor 322, the memory 323, the communication circuit 324, and the charging circuit 327. For example, the sensor 322, the memory 323, the communication circuit 324, and the charging circuit 327 may be controlled by the processor 321.

According to an embodiment, the processor 321 may be configured with at least one processor (that is, one or more processors). For example, the processor 321 may include a main processor performing high-performance processing and a supplementary processor performing low-power processing. At least a portion of the sensor 322 may be connected with the supplementary processor. At least the portion of the sensor 322 connected with the supplementary processor may obtain data about a user for 24 hours. According to an embodiment, one of the main processor and the supplementary processor may be activated, according to a state and/or an operation of the wearable device 200. For example, in a state in which the wearable device 200 is low in battery, the supplementary processor may be activated. For example, in a state in which accurate data on a user is required, the main processor may be activated.

According to an embodiment, the processor 321 may determine an operation timing of the sensor 322. The processor 321 may control an operation of the sensor 322. The processor 321 may process information obtained from the sensor 322.

According to an embodiment, the wearable device 200 may include the sensor 322. The sensor 322 may be used to obtain a variety of information. For example, the sensor 322 may be used to obtain information on a user. The information on the user may include data on a body of the user.

For example, the sensor 322 may be used to obtain body temperature data (or body temperature information), heart rate data (or heart rate information), and/or motion data (or motion information) of the user. For example, the sensor 322 may be configured with at least one sensor. The sensor 322 may include at least one sensor. For example, the sensor 322 may correspond to the sensor module 176 of FIG. 1.

For example, the sensor 322 may include an acceleration sensor 325. The acceleration sensor 325 may be used to identify a change in acceleration of the wearable device 200. For example, the acceleration sensor 325 may identify (or measure, detect) acceleration of the wearable device 200 in three directions of the x-axis, the y-axis, and the z-axis.

For example, the sensor 322 may include a gyro sensor 326. The gyro sensor 326 may identify (or measure or detect) angular velocity of the wearable device 200 in three directions of the x-axis, y-axis, and z-axis. According to an embodiment, the wearable device 200 may include an inertial sensor including the acceleration sensor 325 and the gyro sensor 326.

In some embodiments, the sensor 322 may include, for example, a gesture sensor, an atmospheric pressure sensor, a magnetic sensor, a grip sensor, a proximity sensor, a color sensor, an infrared (IR) sensor, a biometric sensor, a temperature sensor, a humidity sensor, or an illuminance sensor.

According to an embodiment, the wearable device 200 may include the memory 323. For example, the memory 323 may correspond to the memory 130 of FIG. 1. For example, the memory 323 may correspond to the memory 130 of the electronic device 101.

According to an embodiment, the wearable device 200 may include the communication circuit 324. For example, the communication circuit 324 may correspond to at least a portion of the communication module 190 of FIG. 1. For example, the communication circuit 324 may correspond to the communication circuit 314 of the electronic device 101.

For example, the communication circuit 324 may include an NFC circuit 328. For example, the NFC circuit 328 may be referred to as an antenna for NFC. For example, the NFC circuit 328 may be configured in a shape of a loop. The processor 321 may provide power to the NFC circuit 328. As the power is provided to the NFC circuit 328, currents may be circulated in a shape of a loop within a loop formed by the NFC circuit 328. An NFC signal may be emitted, based on the circulated currents.

According to an embodiment, the wearable device 200 may include the charging circuit 327. The charging circuit 327 may be used for wireless charging. For example, the charging circuit 327 may be disposed on a surface (e.g., a first surface 211 or a second surface 212) of a housing 210 of the wearable device 200. The wearable device 200 may receive power from a charging circuit included in an external electronic device. The wearable device 200 may charge a battery using the received power.

According to an embodiment, the wearable device 200 may further include various components besides the components illustrated in FIG. 3. An example of an arrangement of components included in the wearable device 200 will be described later in FIGS. 4A and 4B.

Figure 4A:
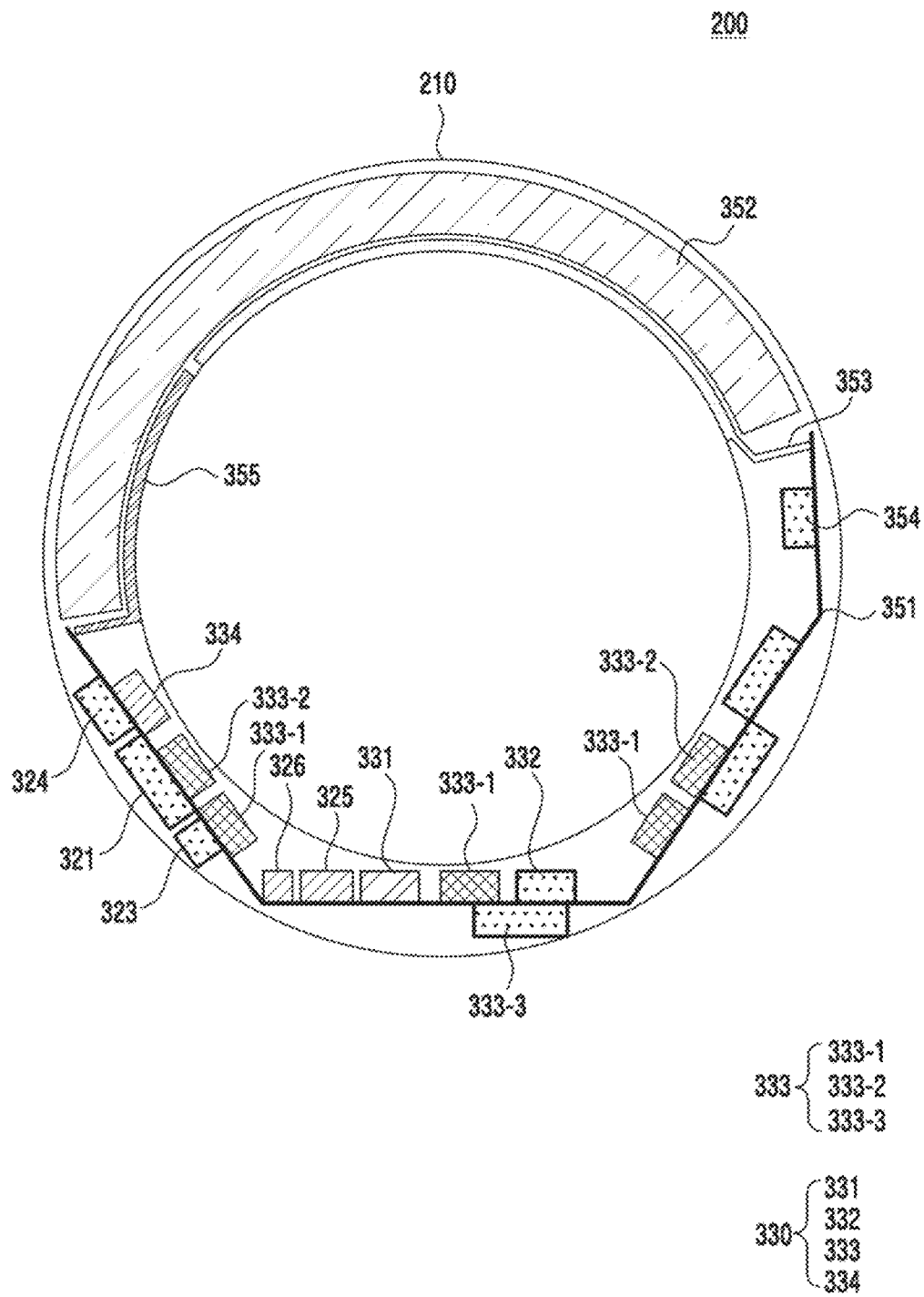
FIG. 4A illustrates an example of a partial cross-sectional view of a wearable device.
Figure 4B:
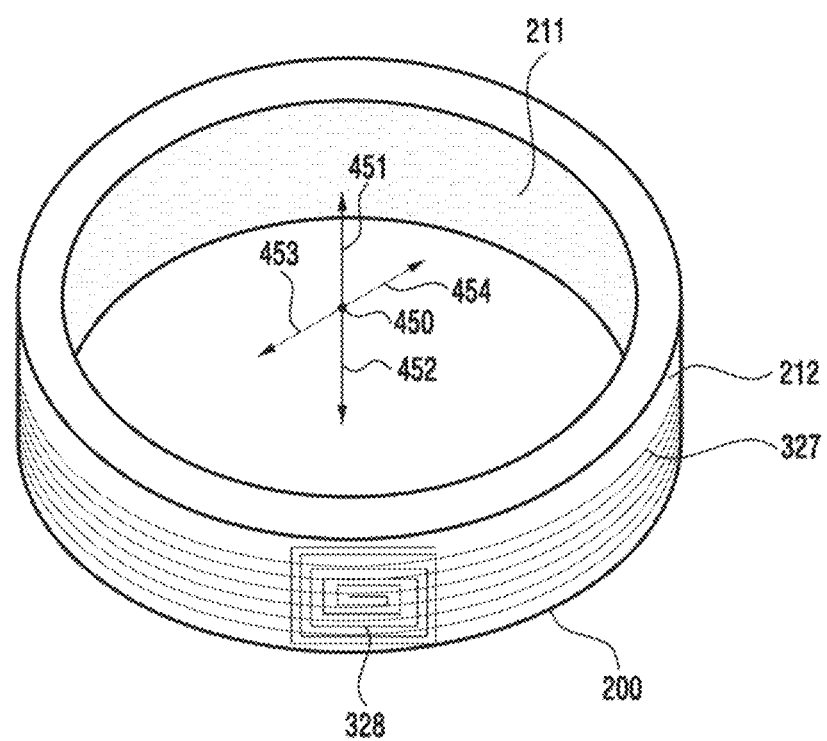
FIG. 4B illustrates an example of a perspective view of a wearable device.

FIG. 4A illustrates an example of a partial cross-sectional view of a wearable device. FIG. 4B illustrates an example of a perspective view of a wearable device.

Referring to FIG. 4A, a wearable device 200 may correspond to the wearable device 200 of FIG. 2. According to an embodiment, the wearable device 200 may be formed in various shapes (e.g., ring, square, or polygon) which are wearable on a user's finger. For example, a housing 210 of the wearable device 200 may be formed in a shape of a ring which is wearable on a user's finger. In FIGS. 4A and 4B, the ring-shaped wearable device 200 having a smooth surface is illustrated as an example. In some embodiments, the wearable device 200 may be implemented as a housing including a plurality of planar surfaces. In some embodiments, the ring-shaped wearable device 200 may have a rough surface.

According to an embodiment, the ring-shaped housing 210 may include a first surface 211 in contact with a body of a user, a second surface 212 exposed to the outside, and a side surface between the first surface 211 and the second surface 212, in a state that is worn on by the user. For example, a space (or an area) for including (or arranging) at least one component may be included between the first surface 211 and the second surface 212.

According to an embodiment, a PCB 351 may be disposed between the first surface 211 and second surface 212 of the wearable device 200. For example, a processor 321, an acceleration sensor 325, a gyro sensor 326, a PPG sensor 333, a temperature sensor 334, memory 323 and/or a PMIC 354 may be disposed on the PCB 351. For example, the PCB 351 may include a rigid area and a flexible area. For example, the rigid area may be referred to as a rigid flexible printed circuit board (RFPCB). For example, the flexible area may be referred to as a flexible printed circuit board (FPCB).

For example, the PPG sensor 333 may include one or more light emitting circuit 333-1, one or more light receiving circuit 333-2, and a control circuit 333-3. For example, the one or more light emitting circuit 333-1 and the one or more light receiving circuit 333-2 may be disposed toward the first surface 211. For example, the control circuit 333-3 may be disposed toward the second surface 212.

For example, the PMIC 354 may be used to manage a power supply of the wearable device 200. The PMIC 354 may be used to provide (or distribute) power to components requiring the power in the wearable device 200. The PMIC 354 may support a wired charging method (e.g., a terminal, a pogo pin) or a wireless charging method (e.g., a wireless power consortium (WPC), NPC) for charging the wearable device 200, through a charging interface 353. For example, the PMIC 354 may be used to perform charging of a battery 352, using a charging circuit 327 (or an NFC circuit 328).

According to an embodiment, the battery 352 may be disposed between the first surface 211 and the second surface 212 of the wearable device 200. The battery 352 may be configured with at least one battery (or battery pack). For example, the battery 352 may be configured such that at least one battery is connected in series and/or in parallel. For example, the battery 352 may be configured as a battery pack which is flexible. For example, the battery 352 may be charged and/or discharged as a secondary battery. For example, a material configuring the battery 352 may be configured variously. For example, the material configuring the battery 352 may include at least one of lithium ion and mercury.

According to an embodiment, an antenna 355 may be disposed between the first surface 211 and the second surface 212 of the wearable device 200. For example, the antenna 355 may be configured as a single antenna and/or a plurality of segmented antennas. According to an embodiment, the antenna 355 may be configured with a portion of the housing 210 of the wearable device 200. For example, the antenna 355 may be electrically connected to a communication circuit 324 through the PCB 351.

In some embodiments, the wearable device 200 may further include other components. For example, the wearable device 200 may include a display. The display may be disposed on an outer surface of the housing 210.

Referring to FIG. 4B, the charging circuit 327 and the NFC circuit 328 may be disposed on the second surface 212 of the wearable device 200. According to an embodiment, the charging circuit 327 may be disposed along at least a portion of an outer shape (e.g., a ring shape) of the second surface 212. The NFC circuit 328 may be disposed on at least a portion of the second surface 212.

For example, the charging circuit 327 may be disposed in the wearable device 200 to generate a magnetic field in one of a direction 451 and a direction 452, at a designated point 450 (e.g., the center of the wearable device 200). The magnetic field may be generated in one of the direction 451 and the direction 452, according to a direction of current flowing in the charging circuit 327. For example, the NFC circuit 328 may be disposed in the wearable device 200 to generate a magnetic field in one of a direction 453 and a direction 454, at the designated point 450. The magnetic field may be generated in one of the direction 453 and the direction 454, according to a direction of current flowing in the NFC circuit 328. For example, each of the direction 451 and the direction 452 may be perpendicular to the direction 453 or the direction 454 substantially.

The charging circuit 327 and the NFC circuit 328 illustrated in FIG. 4B are examples, and the charging circuit 327 and the NFC circuit 328 may be disposed in the wearable device 200, such that directions of the magnetic field, generated in each of the charging circuit 327 and the NFC circuit 328, are perpendicular substantially. In the following description, an example in which the electronic device 101 identifies a position of a wearable device 200, using a magnetic field generated (or emitted) in each of a charging circuit 327 and an NFC circuit 328, may be described. The charging circuit 327 and the NFC circuit 328 are examples, and other circuits generating a magnetic field in a direction substantially perpendicular may be used.

Figure 5:
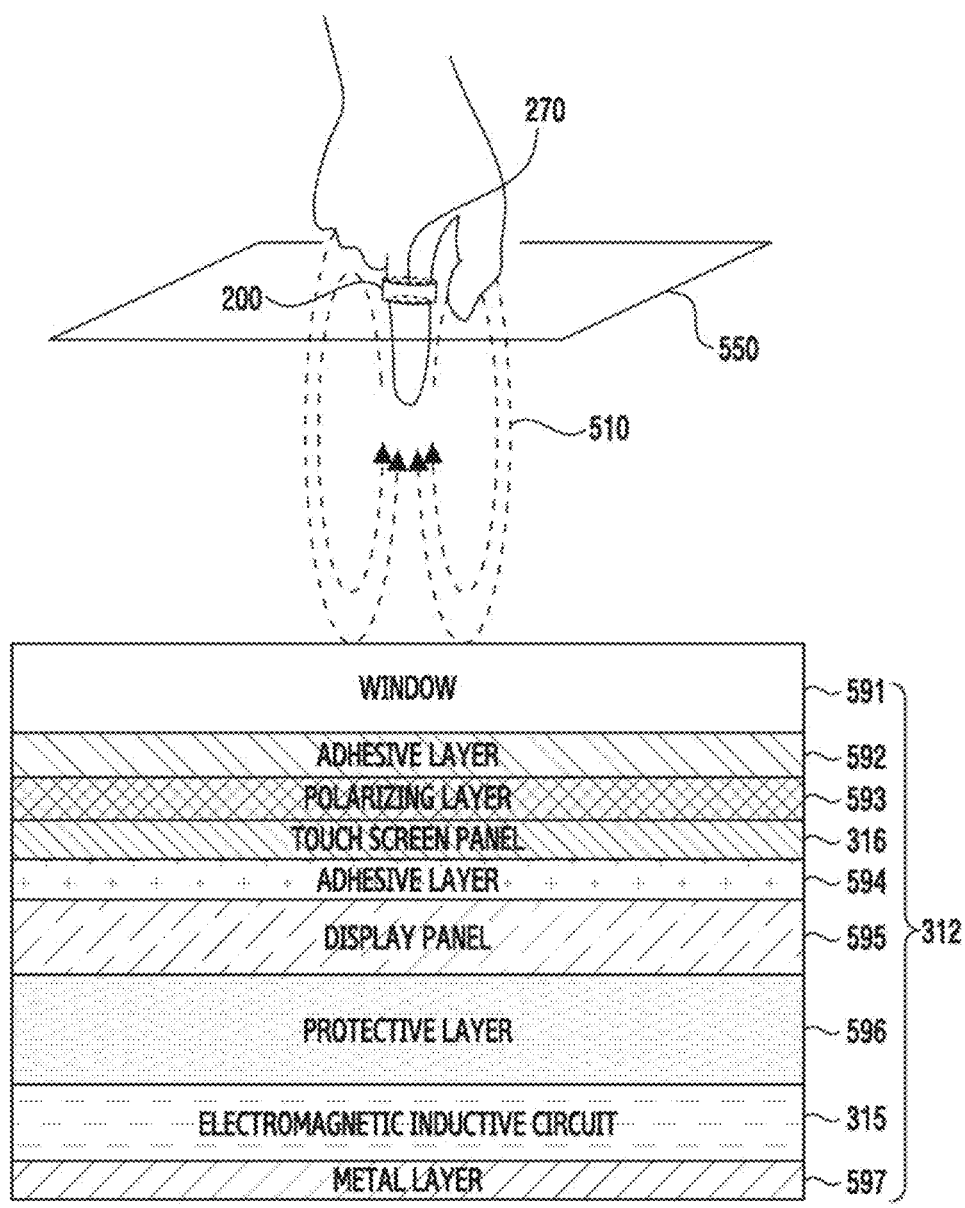
FIG. 5 illustrates an example of an operation of identifying an access of a wearable device through a display.

FIG. 5 illustrates an example of an operation of identifying an access of a wearable device through a display.

Referring to FIG. 5, the display 312 may be configured based on a plurality of layers. According to an embodiment, the display 312 may include a window 591, an adhesive layer 592, a polarizing layer 593, a touch screen panel 316, an adhesive layer 594, a display panel 595, a protective layer 596, an electromagnetic inductive circuit 315, and a metal layer 597. FIG. 5 illustrates the plurality of the layers included in the display 312. According to an embodiment, the plurality of the layers may further include an additional layer, or may not include a portion of the plurality of the layers. According to an embodiment, a portion of the plurality of the layers may be combined with other layers. Stacking sequence and a structure of the plurality of the layers of the display 312 may be changed according to an embodiment.

For example, the window 591 may be disposed on a surface of the display panel 595. The window 591 may be disposed to protect the display panel 595, and transmit light emitted from the display panel 595 to the outside. For example, the adhesive layer 592 and the adhesive layer 594 may include an optically clear adhesive (OCA). For example, the polarizing layer 593 may be disposed to enable light to pass through, which vibrates along a designated linear trajectory. For example, the protective layer 596 may be disposed to protect the display 312 by absorbing an external impact. The protective layer 596 may include a light blocking layer (e.g., an embo layer) and a cushion layer. The metal layer 597 may be disposed to prevent interference caused by an external electrical signal.

According to an embodiment, a wearable device 200 may access the display 312 of the electronic device 101. Based on a movement of a portion of a body of a user, the wearable device 200 may access the display 312. In a case that a planar surface 550 corresponding to a hole 270 of the wearable device 200 is parallel to the display 312 of the electronic device 101 substantially, a direction of a magnetic field 510 may be perpendicular to the display 312 substantially.

According to an embodiment, the wearable device 200 (or a processor 321 of the wearable device 200) may provide power to at least one circuit (e.g., a charging circuit (the charging circuit 327 of FIG. 4B) or an NFC circuit (the NFC circuit 328 of FIG. 4B)). A magnetic field 510 may be generated, based on that the power is provided to the at least one circuit. The magnetic field 510 may be perpendicular to the display 312 substantially.

According to an embodiment, the processor 311 of the electronic device 101 may identify the magnetic field 510 using the electromagnetic inductive circuit 315. The processor 311 may identify an intensity of the magnetic field 510 using the electromagnetic inductive circuit 315. The processor 311 may identify a distance of the wearable device 200 with respect to the display 312, based on the intensity of the magnetic field 510. For example, the wearable device 200 may apply a current of a designated frequency to at least one circuit. The processor 311 may identify a posture (or an orientation) of the wearable device 200, based on a pattern of the magnetic field identified using the electromagnetic inductive circuit 315.

According to an embodiment, the pattern of the magnetic field (identified using the electromagnetic inductive circuit 315) may be changed according to a size of a portion of a body (e.g., a finger) of a user and/or a wearing position of the wearable device 200. The processor 311 of the electronic device 101 may change a reference value (or reference information) for identifying the posture (or the orientation) of the wearable device 200, based on the user or the user's use experience.

For example, based on that a planar surface corresponding to the hole 270 of the wearable device 200, is parallel to the display 312 substantially, the processor 311 may store information (or a value) obtained through the electromagnetic inductive circuit 315, in the memory 313. The processor 311 may identify a position (e.g., a height) of the wearable device 200 with respect to the display 312, based on the obtained information. The processor 311 may identify a posture (or an orientation) of the wearable device 200, based on the identified position (e.g., the height). In some embodiments, the position and the posture may be non-limiting examples of the position relationship.

According to an embodiment, the wearable device 200 may obtain information on acceleration and/or information on angular velocity of the wearable device 200. The wearable device 200 may identify a posture (or an orientation) of the wearable device 200, based on the information on the acceleration and/or the information on the angular velocity. The wearable device 200 may transmit the information indicating the posture (or the orientation) of the wearable device 200 to the electronic device 101. The electronic device 101 may identify a position and the posture (or the orientation) of the wearable device 200 with respect to the display 312 of the electronic device 101, based on the information indicating the posture (or the orientation) of the wearable device 200 and the information obtained through the electromagnetic inductive circuit 315. According to an embodiment, the wearable device 200 may transmit the information on the acceleration and/or the information on the angular velocity to the electronic device 101. The electronic device 101 may identify the position and the posture (or the orientation) of the wearable device 200 with respect to the display 312 of the electronic device 101, based on the information obtained through the electromagnetic inductive circuit 315, the information on the acceleration, and/or the information on the angular velocity.

Figure 6:
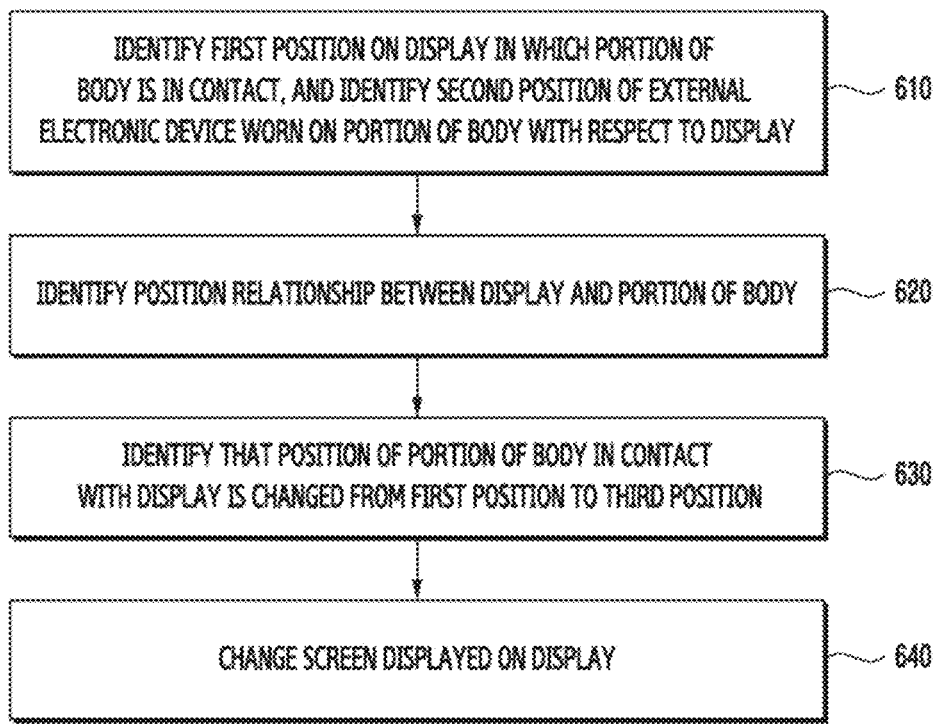
FIG. 6 illustrates a flowchart with respect to operations performed by an electronic device.

FIG. 6 illustrates a flowchart with respect to operations performed by an electronic device. In the following embodiment, each of operations may be performed sequentially, but may be not necessarily performed sequentially. For example, order of each of the operations may be changed, and at least two operations may be performed in parallel.

Referring to FIG. 6, at operation 610, the processor 311 of the electronic device 101 may identify a first position on the display 312 in which a portion of a body of a user is in contact, and identify a second position of a wearable device 200 worn on the portion of the body, with respect to the display 312. For example, the processor 311 may identify the first position on the display 312 in which the portion of the body is in contact, based on identifying that the portion of the body of the user is in contact with the display 312, and identify a second position of the wearable device 200 with respect to the display 312.

For example, the processor 311 may identify that the portion of the body of the user is in contact on the display 312. The processor 311 may identify the first position on the display 312 in which the portion of the body is in contact. For example, the processor 311 may identify the first position on the display 312 in which the portion of the body is in contact, using a touch screen panel 316.

For example, the processor 311 may identify the second position of the wearable device 200 worn on the portion of the body of the user with respect to the display 312. For example, the processor 311 may identify the second position of the wearable device 200 with respect to the display 312, using an electromagnetic inductive circuit 315.

According to an embodiment, the processor 311 may identify an input for activating the electromagnetic inductive circuit 315, while the touch screen panel 316 is activated, and the electromagnetic inductive circuit 315 is deactivated. The input may be received from the user. The processor 311 may activate the electromagnetic inductive circuit 315, based on the identified input. The processor 311 may change the electromagnetic inductive circuit 315 from a deactivated state to an activated state, based on the identified input. The processor 311 may transmit a signal causing the wearable device 200 to provide power to at least one circuit (e.g., a charging circuit 327 or an NFC circuit 328) included in the wearable device 200, based on the identified input. The wearable device 200 may provide the power to the at least one circuit of the wearable device 200, based on the signal. Based on that the power is provided to the at least one circuit included in the wearable device 200, the processor 311 may identify the second position of the wearable device 200 with respect to the display 312, using the electromagnetic inductive circuit 315.

For example, while the power is provided to the at least one circuit included in the wearable device 200, it may be seen that the portion of the body is in contact with the display 312, using the touch screen panel 316. While the power is provided to the at least one circuit included in the wearable device 200, the processor 311 may identify the second position of the wearable device 200 with respect to the display 312, using the electromagnetic inductive circuit 315.

For example, the at least one circuit of the wearable device 200 may include a first circuit (e.g., the charging circuit 327) and a second circuit (e.g., the NFC circuit 328). The first circuit may be disposed in the wearable device 200 to generate a magnetic field in a first direction, at a designated point with respect to the wearable device 200. The second circuit may be disposed in the wearable device 200 to generate a magnetic field in a second direction perpendicular (or substantially perpendicular) to the first direction, at the designated point.

For example, the wearable device 200 may be worn on a portion (e.g., a finger) of the body in contact on the display 312. The user may provide a touch input, using the index finger in a state of wearing the wearable device 200 on the index finger.

At operation 620, the processor 311 may identify a position relationship between the display 312 and the portion of the body of the user. For example, the processor 311 may identify the position relationship between the display 312 and the portion of the body of the user, based on the first position and the second position.

According to an embodiment, the processor 311 may identify that a distance between the first position and the second position is less than or equal to a reference distance. The processor 311 may identify the position relationship between the display 312 and the portion of the body, based on identifying that the distance between the first position and the second position is less than or equal to the reference distance. For example, the processor 311 may identify that the wearable device 200 is worn on the portion of the body of the user in contact with the display 312, based on identifying that the distance between the first position and the second position is less than or equal to the reference distance. The processor 311 may identify the position relationship between the display 312 and the portion of the body, based on identifying that the wearable device 200 is worn on the portion of the body of the user in contact with the display 312.

According to an embodiment, the processor 311 may identify that the distance between the first position and the second position exceeds the reference distance. The processor 311 may identify that the wearable device 200 is not worn on the portion of the body of the user in contact with the display 312, based on identifying that the distance between the first position and the second position exceeds the reference distance. The processor 311 may identify that the wearable device 200 is worn on another portion of the body, based on identifying that the distance between the first position and the second position exceeds the reference distance.

According to an embodiment, the position relationship between the display 312 and the portion of the body may include an angle between the display 312 and the portion of the body. For example, the processor 311 may identify an angle between the display 312 and a finger where the wearable device 200 is worn on. For example, the processor 311 may identify the position relationship between the display 312 and the portion of the body, by identifying the angle between vector from the first position to the second position and a planar surface corresponding to the display 312.

At operation 630, the processor 311 may identify that the position of the portion of the body in contact with the display 312 is changed from the first position to a third position. For example, it may be identified that the position of the portion of the body in contact with the display 312 is changed from the first position to the third position, according to a movement of the portion of the body of the user. For example, the processor 311 may identify a drag input (or swipe input) from the first position to the third position.

At operation 640, the processor 311 may change a screen displayed on the display 312, based on the position relationship and the third position changed from the first position. For example, the processor 311 may display a visual object from the first position to the third position, based on a touch input changed from the first position to the third position. In some embodiments, a thickness of the visual object may be set, based on the position relationship. The processor 311 may display the visual object having the thickness set based on the angle between the display 312 and the portion of the body. The processor 311 may change the screen by displaying the visual object on the screen.

Figure 7:
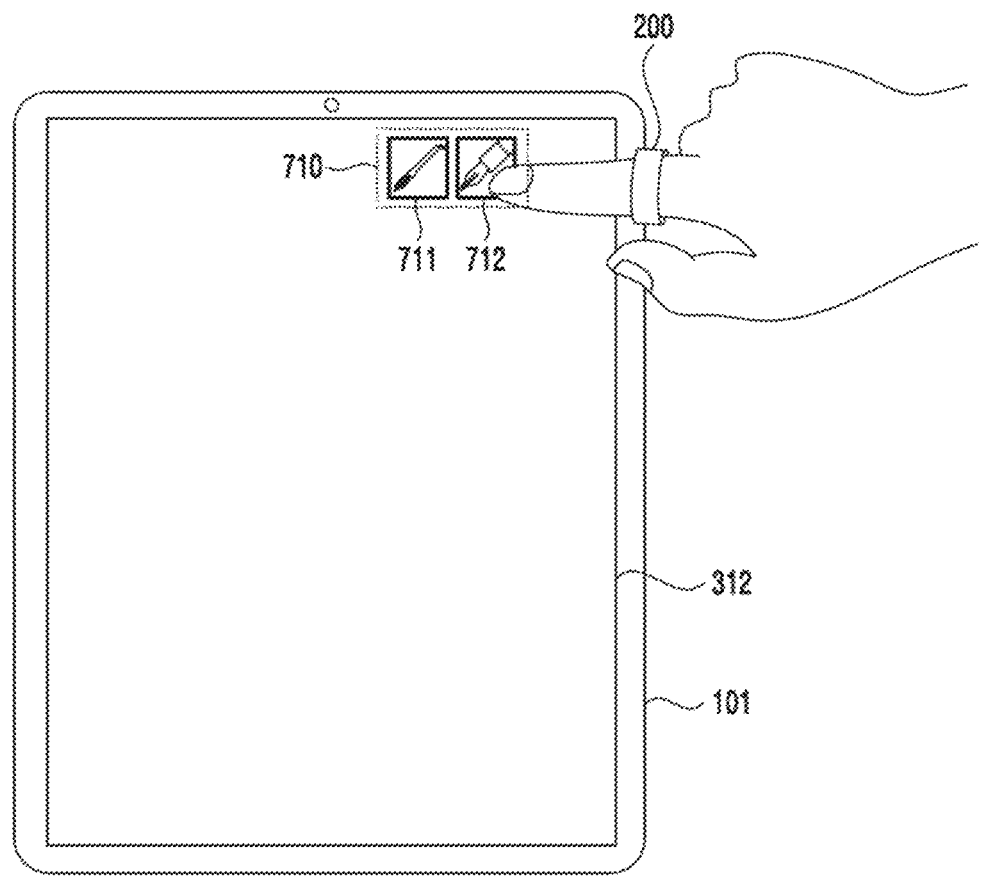
FIG. 7 illustrates an example of an input for activating an electromagnetic inductive circuit.

FIG. 7 illustrates an example of an input for activating an electromagnetic inductive circuit.

Referring to FIG. 7, the processor 311 of the electronic device 101 may display at least one object 710 for changing an expression (e.g., texture, thickness, or color) of an object according to a touch input, based on a position relationship between the display 312 and a portion of a body (e.g., a finger), on a designated area of the display 312. For example, the at least one object 710 may be displayed to provide a handwriting function, through the portion of the body of the user. For example, the at least one object 710 may display an object for setting a pen type for handwriting. For example, the at least one object 710 may include an object 711 for providing a handwriting function of a brush-type, and an object 712 for providing handwriting function of a fountain pen-type.

The processor 311 may identify an input with respect to one among the at least one object 710, while a touch screen panel 316 is activated and an electromagnetic inductive circuit 315 is inactivated. The processor 311 may activate the electromagnetic inductive circuit 315, based on the identified input. For example, the identified input may be an example of an input for activating the electromagnetic inductive circuit 315.

According to an embodiment, in response to (based on) the input, the processor 311 may identify a position where a touch on the display 312 occurs and a position of the wearable device 200 with respect to the display 312. The processor 311 may identify information on acceleration and/or information on angular velocity of the wearable device 200 obtained from the wearable device 200. The processor 311 may identify a posture (or an orientation) of the wearable device 200 with respect to the display 312, based on the information on the acceleration and/or the information on the angular velocity of the wearable device 200. For example, the processor 311 may identify a position relationship between the display 312 and the portion of the body, based on the posture (or the orientation) of the wearable device 200 with respect to the display 312. As an example of the position relationship, the processor 311 may identify whether an angle between the display 312 and the portion of the body is substantially perpendicular. For example, the processor 311 may identify the position (e.g., height) of the wearable device 200 with respect to the display 312, using the electromagnetic inductive circuit 315. The processor 311 may store information obtained through the electromagnetic inductive circuit 315 in the memory 313, in connection with the position (e.g., height) of the wearable device 200 with respect to the display 312. Based on the stored information, the processor 311 may change and display an expression method (e.g., texture, thickness, or color) with respect to the handwriting function, according to an angle at which the portion of the body of the user is tilted with respect to the display 312.

According to an embodiment, the processor 311 may change the electromagnetic inductive circuit 315 from a deactivated state to an activated state, based on an input with respect to one among at least one object 710. Based on the identified input, the processor 311 may transmit a signal causing the wearable device 200 to provide power to at least one circuit (e.g., a charging circuit 327 or an NFC circuit 328) in the wearable device 200. Based on the identified input, the wearable device 200 may provide the power to the at least one circuit of the wearable device 200. While the power is provided to the at least one circuit in the wearable device 200, the processor 311 may identify a first position of the portion of the body in contact on the display 312, using the touch screen panel 316. The processor 311 may identify a second position of the wearable device 200, using the electromagnetic inductive circuit 315. The processor 311 may identify the position relationship between the display 312 and the portion of the body, based on the first position and the second position. The processor 311 may change and display the expression method (e.g., texture, thickness, or color) with respect to the handwriting function, based on the position relationship.

Figure 8A:
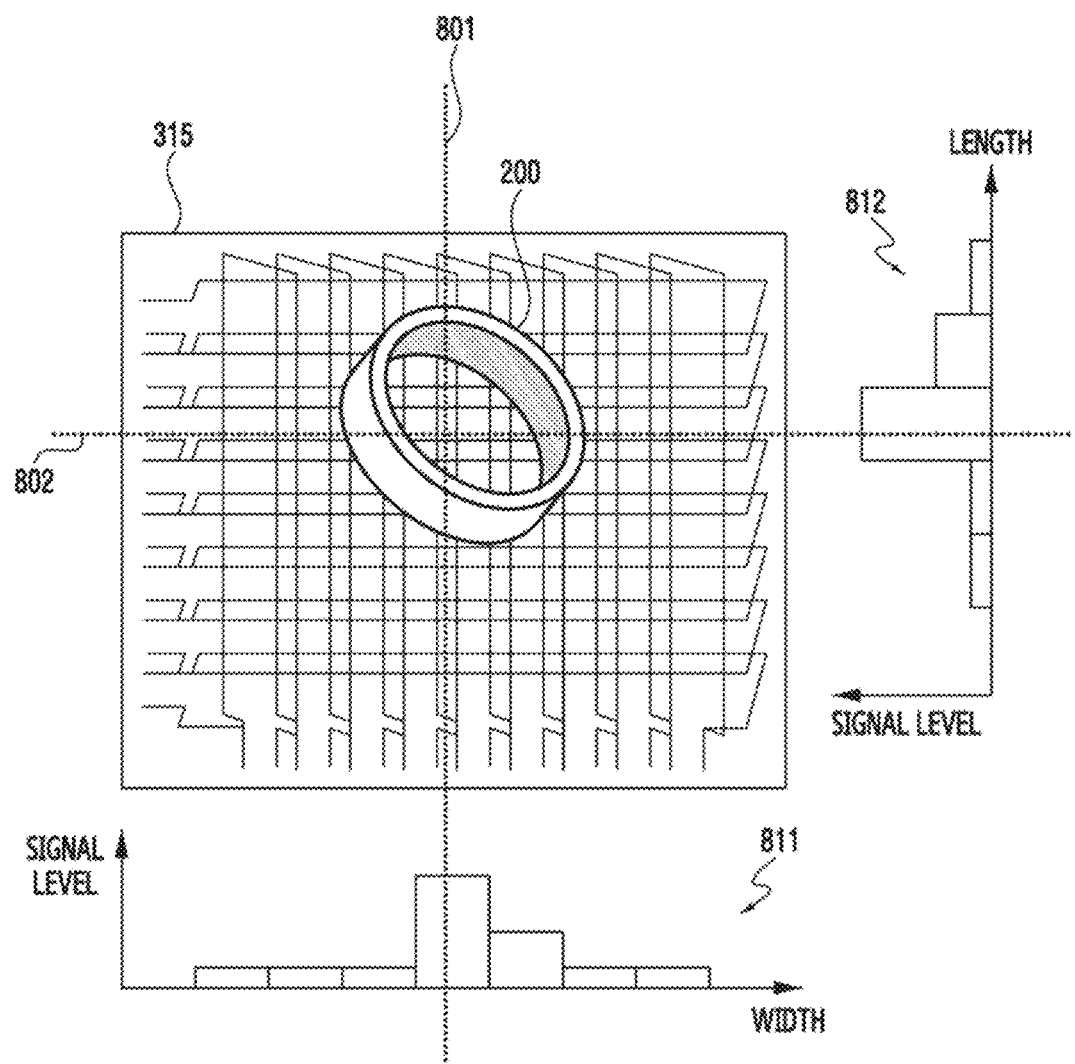
FIG. 8A illustrates an example of an operation for identifying a position relationship between a display and a portion of a body of a user.

FIG. 8A illustrates an example of an operation for identifying a position relationship between a display and a portion of a body of a user.

Referring to FIG. 8A, in a state that a wearable device 200 is positioned on the display 312, the processor 311 may identify a position of the wearable device 200, using an electromagnetic inductive circuit 315. The processor 311 may identify not only the position of the wearable device 200 with respect to the display 312 but also a posture (or an orientation) of the wearable device 200.

For example, the processor 311 may identify a signal level, according to a position on the display 312, using the electromagnetic inductive circuit 315. A graph 811 represents a signal level identified through the electromagnetic inductive circuit 315 along a line 802. A graph 812 represents a signal level identified through the electromagnetic inductive circuit 315 along a line 801. FIG. 8A illustrates the signal level identified along the line 801 and 802. In some embodiments, the signal level with respect to an area of the display 312 may be identified in a form of a contour line.

For example, the processor 311 may identify the position of the wearable device 200. The processor 311 may identify a position on the display 312 where the signal level is identified as the largest. The processor 311 may identify a height of the wearable device 200 with respect to the display 312, based on a size of the signal level.

According to an embodiment, the processor 311 may identify the position of the wearable device 200, using the electromagnetic inductive circuit 315 (e.g., the electromagnetic inductive circuit 315 of FIG. 3) rather than a touch screen panel 316. Since an identifiable distance through the electromagnetic inductive circuit 315 is longer than an identifiable distance through the touch screen panel 316 (e.g., the touch screen panel 316 of FIG. 3), the processor 311 may identify the position of the wearable device 200, through the electromagnetic inductive circuit 315. The processor 311 may pre-store a pattern (e.g., shape or intensity) of the signal level identified using the electromagnetic inductive circuit 315, according to the position and the posture of the wearable device 200. The processor 311 may compare the pre-stored pattern (e.g., a pre-stored shape or a pre-stored intensity) of the signal level with a pattern of the signal level identified according to an approach of the wearable device 200. The processor 311 may identify the position and the posture of the wearable device 200, based on the comparison.

For example, the processor 311 may pre-store (store in advance) the pattern of the signal level, according to the position and the posture of the wearable device 200. The processor 311 may identify a feature (e.g., distribution, variance, standard deviation, average value, and/or intermediate value) of the signal level identified according to the position and the posture of the wearable device 200. The processor 311 may identify the pattern of the signal level, based on the identified feature of the signal level. The processor 311 may store the pattern of the signal level in memory 313 (e.g., the memory 313 of FIG. 3).

For example, the wearable device 200 may have different a material (e.g., stainless steel or ceramic), circuit configuration, and/or a size, depending on a product, and may have a different physical characteristic (e.g., length of a finger, thickness of a finger) of a user wearing the wearable device 200, depending on the user. Accordingly, the pattern of the signal level according to the position of the wearable device 200 may be changed. Therefore, the processor 311 may learn the pattern of the signal level, according to the position and the posture of the wearable device 200, based on usage history of the wearable device 200. The processor 311 may estimate the position and/or the posture of the wearable device 200, based on the learned data.

Figure 8B:
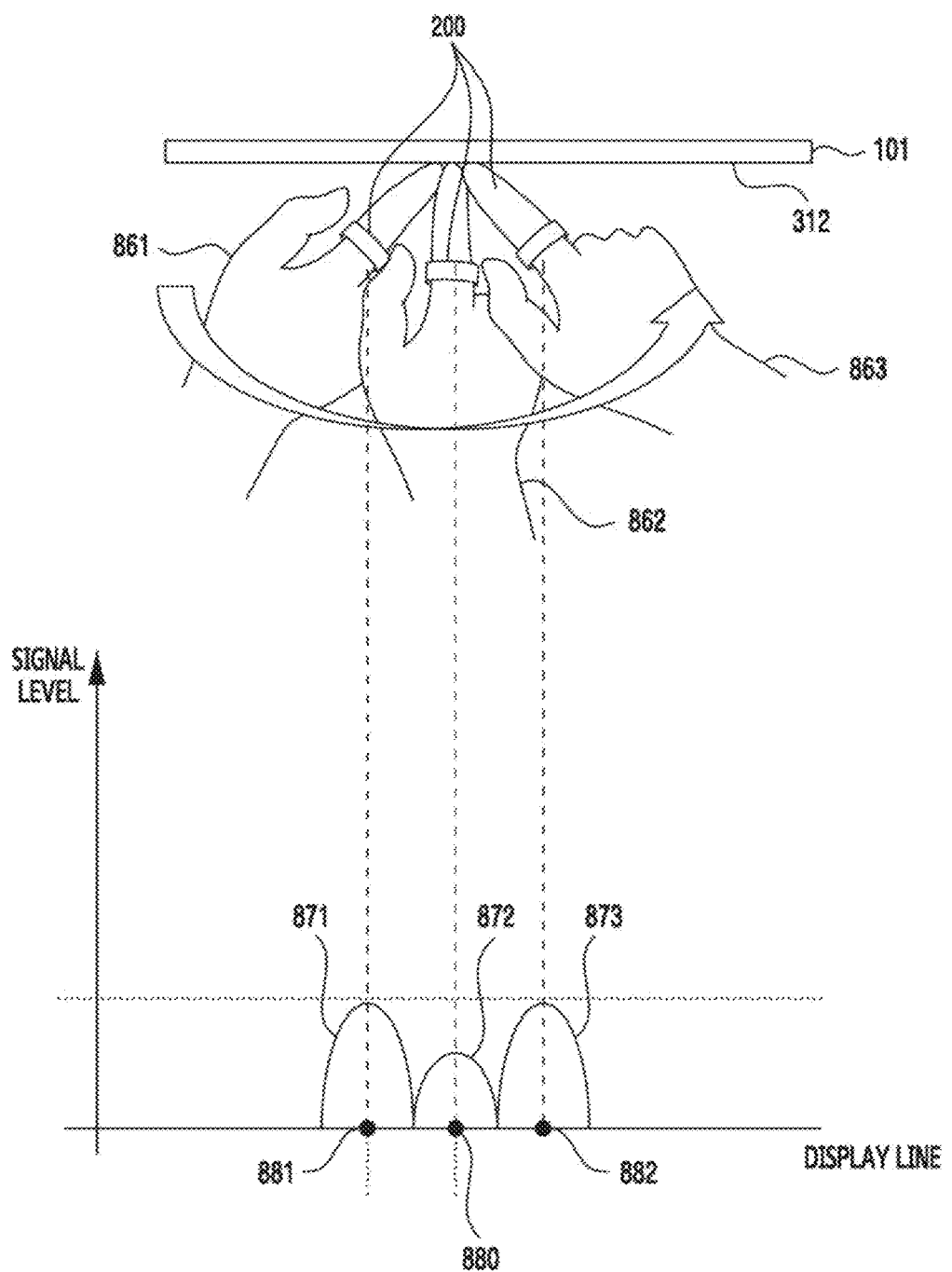
FIG. 8B illustrates an example of an operation for identifying a position relationship between a display and a portion of a body of a user.

FIG. 8B illustrates an example of an operation for identifying a position relationship between a display and a portion of a body of a user.

Referring to FIG. 8B, a user of the electronic device 101 may provide a touch input, through various postures using a portion (e.g., a finger) of a body of the user. As a non-limiting example, an angle between the display 312 and the portion of the body of the user is changed along a designated line will be described in FIG. 8B.

For example, the user may provide a touch input with respect to a point 880 through a posture 862. The processor 311 may identify that an angle of the portion of the body of the user with respect to the display 312 is substantially perpendicular. A graph 872 represents a signal level identified through the electromagnetic inductive circuit 315 along a designated line, while the touch input is provided through the posture 862. Referring to the graph 872, the signal level may be identified as the largest at the point 880 on the display 312. The processor 311 may identify that the wearable device 200 is positioned in a line perpendicular to the display 312, including the point 880. The processor 311 may identify a distance from the point 880 on the display 312 to the wearable device 200, based on a size of the signal level.

For example, the user may provide a touch input with respect to the point 880 through the posture 861. A graph 871 represents a signal level identified through the electromagnetic inductive circuit 315 along a designated line, while the touch input is provided through the posture 861. Referring to the graph 871, the signal level may be identified as the largest at a point 881 on the display 312. The processor 311 may identify that the wearable device 200 is positioned in a line perpendicular to the display 312, including the point 881. The processor 311 may identify a distance from the point 881 on the display 312 to the wearable device 200, based on a size of the signal level. The processor 311 may identify an angle between the display 312 and the portion of the body of the user, based on a distance between the point 880 and the point 881 and a distance from the point 881 to the wearable device 200.

For example, the processor 311 may identify the angle between the display 312 and the portion of the body of the user, using a following equation.

$$\theta_1 = \arctan\left(\frac{d_1}{h_1}\right) \qquad \text{[Equation 1]}$$

Referring to the Equation 1, $\theta_1$ is the angle between the display 312 and the portion of the body of the user. $d_1$ is the distance between the point 880 and the point 881. $h_1$ is the distance from the point 881 to the wearable device 200. In some embodiments, the above Equation 1 may indicate the position relationship of the disclosure.

For example, the user may provide a touch input with respect to the point 880 through a posture 863. A graph 873 represents a signal level identified through the electromagnetic inductive circuit 315 along a designated line, while the touch input is provided through the posture 863. Referring to the graph 873, the signal level may be identified as the largest at a point 882 on the display 312. The processor 311 may identify that the wearable device 200 is positioned in a line perpendicular to the display 312, including the point 882. The processor 311 may identify a distance from the point 882 on the display 312 to the wearable device 200, based on a size of the signal level. The processor 311 may identify an angle between the display 312 and the portion of the body of the user, based on a distance between the point 880 and the point 882 and a distance from the point 882 to the wearable device 200.

For example, the processor 311 may identify the angle between the display 312 and the portion of the body of the user, using a following equation.

$$\theta_2 = \arctan\left(\frac{d_2}{h_2}\right) \qquad \text{[Equation 2]}$$

Referring to the Equation 2, $\theta_2$ is the angle between the display 312 and the portion of the body of the user. $d_2$ is the distance between the point 880 and the point 882. $h_2$ is the distance from the point 882 to the wearable device 200. The Equation 2 may correspond to the Equation 1.

According to an embodiment, the processor 311 may identify a position or a posture of the wearable device 200 with respect to the display 312, based on information on acceleration of the wearable device 200 and information on angular velocity, obtained from the wearable device 200.

Figure 9A:
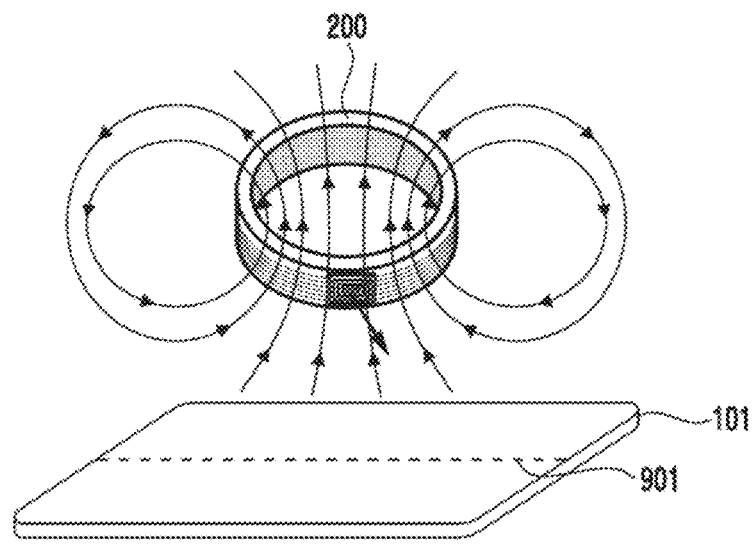
FIG. 9A illustrates an example of an operation for identifying a position relationship between a display and a portion of a body of a user.
Figure 9A:
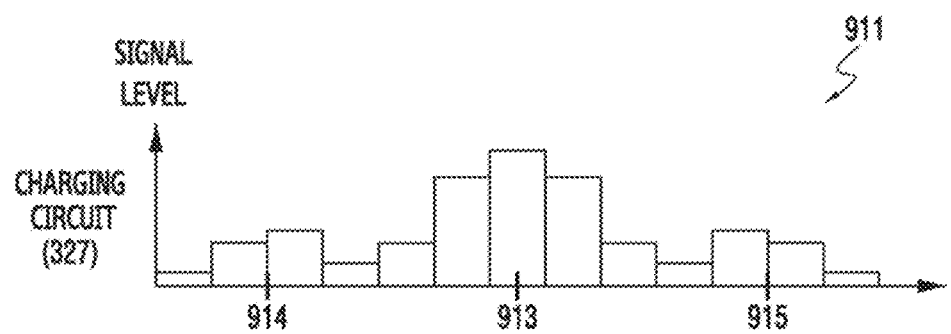
Figure 9A:
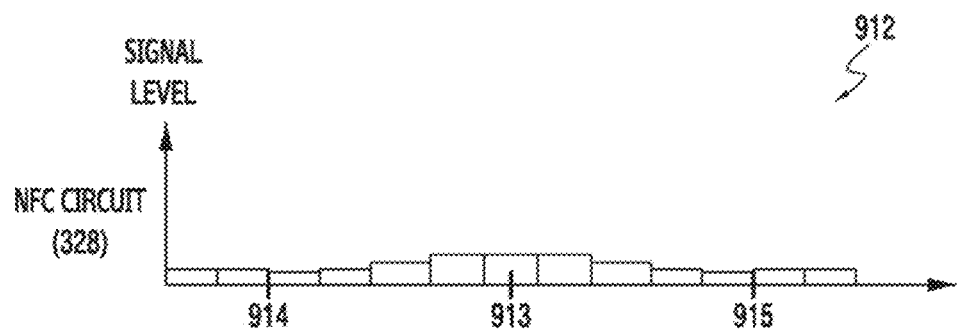
Figure 9B:
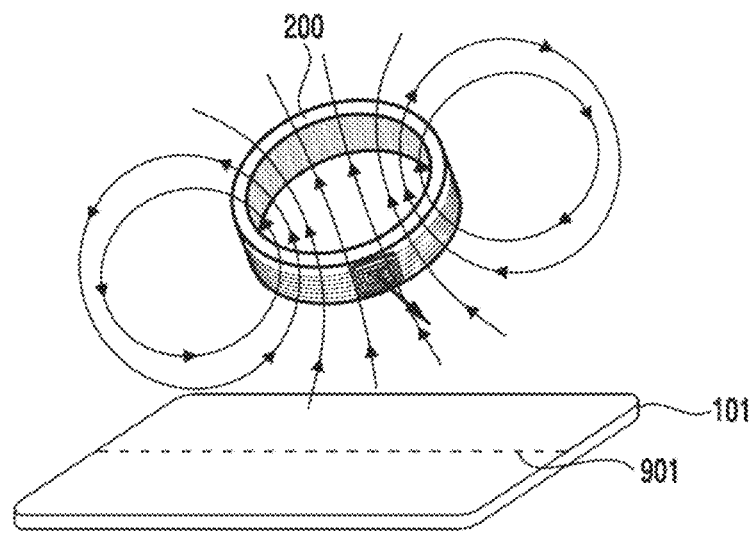
FIG. 9B illustrates an example of an operation for identifying a position relationship between a display and a portion of a body of a user.
Figure 9B:
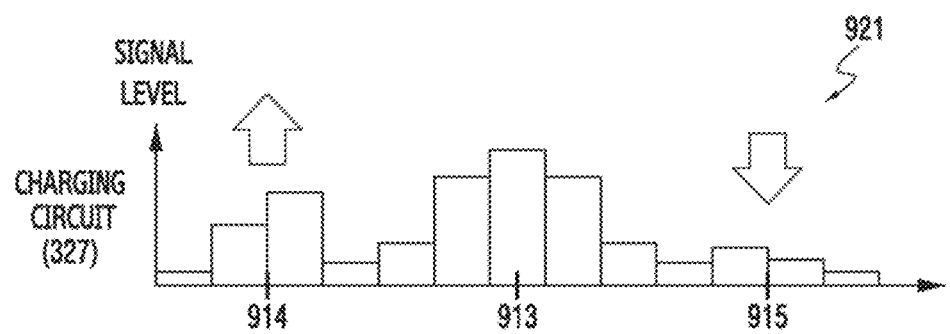
Figure 9B:
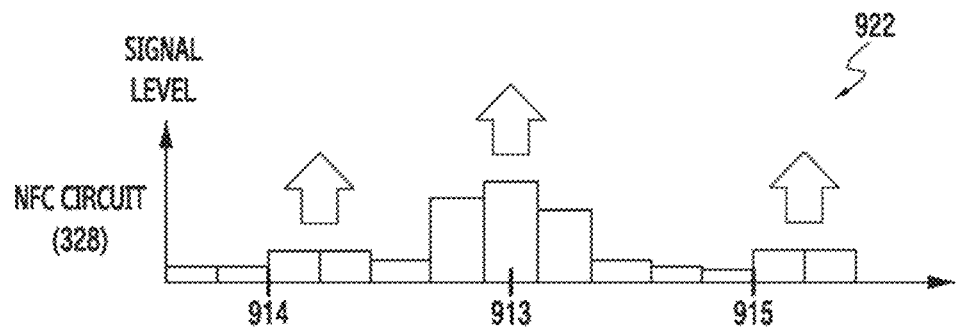

FIG. 9A illustrates an example of an operation for identifying a position relationship between a display and a portion of a body of a user. FIG. 9B illustrates an example of an operation for identifying a position relationship between a display and a portion of a body of a user.

Referring to FIGS. 9A and 9B, the processor 311 may not identify a position of a wearable device 200, according to a direction of a magnetic field generated by the wearable device 200. For example, in a case that the direction of the magnetic field generated by the wearable device 200 is parallel to the display 312, the position of the wearable device 200 may not be identified. Accordingly, the wearable device 200 may generate a magnetic field using two or more circuits. For example, the wearable device 200 may generate a magnetic field using a charging circuit 327 and an NFC circuit 328.

For example, a direction of the magnetic field generated through the charging circuit 327 at a designated point (e.g., a center point of the wearable device 200) of the wearable device 200 may be perpendicular to a direction of the magnetic field generated through the NFC circuit 328.

Referring to FIG. 9A, in a case that a planar surface corresponding to a hole 270 of the wearable device 200 is substantially horizontal to the display 312 of the electronic device 101, the processor 311 may identify the magnetic field emitted through the charging circuit 327 of the wearable device 200, through the electromagnetic inductive circuit 315. A graph 911 may represent a signal level identified through the electromagnetic inductive circuit 315 according to a line 901. According to the graph 911, a signal level may be identified as the largest at a point 913 on the line 901. A signal level identified at each of a point 914 and a point 915 on the line 901 may be lower than the signal level identified at the point 913.

In a case that the planar surface corresponding to the hole 270 of the wearable device 200 is substantially horizontal to the display 312 of the electronic device 101, the processor 311 may identify the magnetic field emitted through the NFC circuit 328 of the wearable device 200, through the electromagnetic inductive circuit 315. In a case that the planar surface corresponding to the hole 270 of the wearable device 200 is substantially horizontal to the display 312 of the electronic device 101, a direction of the magnetic field emitted through the NFC circuit 328 may be substantially horizontal to the display 312. A graph 912 may represent a signal level identified through the electromagnetic inductive circuit 315 according to the line 901. Referring to the graph 912, the signal levels identified at a point 913, a point 914, and a point 915 may have a difference less than or equal to a reference value. Accordingly, the processor 311 may not identify the position of the wearable device 200 through the magnetic field emitted through the NFC circuit 328. On the other hand, the wearable device 200 may identify the position of the wearable device 200 through the magnetic field generated from the charging circuit 327.

Referring to FIG. 9B, a posture of the wearable device 200 may be changed from the posture illustrated in FIG. 9A. The planar surface (corresponding to the hole 270 of the wearable device 200) may not be substantially horizontal to the display 312 of the electronic device 101. In a case that the planar surface corresponding to the hole 270 of the wearable device 200 is not substantially horizontal to the display 312 of the electronic device 101, the processor 311 may identify the magnetic field emitted through the charging circuit 327 of the wearable device 200 through the electromagnetic inductive circuit 315. A graph 921 may represent a signal level identified through the electromagnetic inductive circuit 315 according to the line 901. According to the graph 911 of FIG. 9A and the graph 921 of FIG. 9B, based on the change in the posture of the wearable device 200, the signal level may increase at the point 914 of the graph 921 of FIG. 9B. Based on that the posture of the wearable device 200 is changed, the signal level may decrease at the point 915 of the graph 921 of FIG. 9B.

According to an embodiment, in a case that the planar surface corresponding to the hole 270 of the wearable device 200 is not substantially horizontal to the display 312 of the electronic device 101, the processor 311 may identify the magnetic field emitted through the NFC circuit 328 of the wearable device 200 through the electromagnetic inductive circuit 315. According to an embodiment, a graph 922 may represent a signal level identified through the electromagnetic inductive circuit 315 according to the line 901. According to the graph 912 of FIG. 9A and the graph 922 of FIG. 9B, based on that the posture of the wearable device 200 is changed, the signal level may all increase at each of the point 913, the point 914, and the point 915.

For example, the processor 311 may identify the position (or posture) of the wearable device 200, based on the graph 921 and the graph 922 (or the change of the signal level).

In a case that the planar surface corresponding to the hole 270 of the wearable device 200 is substantially perpendicular to the display 312 of the electronic device 101, the processor 311 may identify the signal level based on the magnetic field emitted through the charging circuit 327 of the wearable device 200. The signal levels identified at the point 913, the point 914, and the point 915 may have a difference less than or equal to a reference value each other. Accordingly, the processor 311 may not identify the position of the wearable device 200, through the magnetic field generated from the charging circuit 327. On the other hand, the wearable device 200 may identify the position (or posture) of the wearable device 200, through the magnetic field generated from the NFC circuit 328.

As described above, at a designated point (e.g., the center of the wearable device 200) with respect to the wearable device 200, the direction of the magnetic field generated by the charging circuit 327 may be substantially perpendicular to the direction of the magnetic field generated by the NFC circuit 328. Accordingly, the electronic device 101 may identify the position of the wearable device 200, based on at least one of the magnetic field generated by the charging circuit 327 and/or the magnetic field generated by the NFC circuit 328. In FIG. 9A and FIG. 9B, an example of generating the magnetic field using the charging circuit 327 and the NFC circuit 328 of the wearable device 200 has been described. In some other embodiments, the wearable device 200 may generate a magnetic field using other circuits (e.g., coil) of the wearable device 200.

Figure 10:
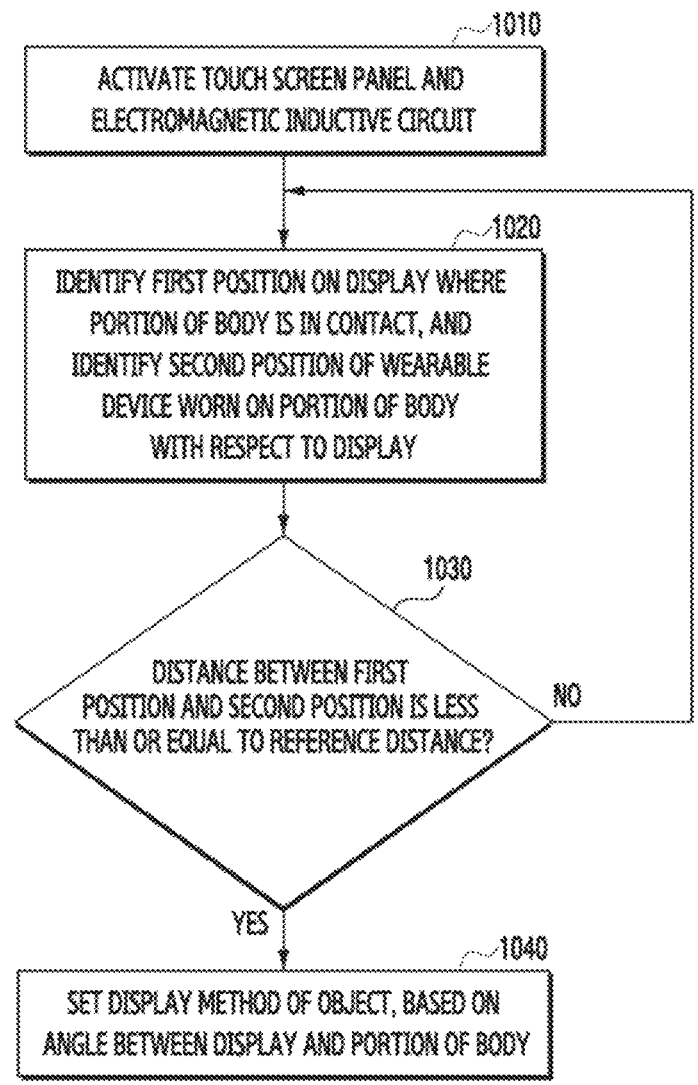
FIG. 10 is a flowchart illustrating operations performed by an electronic device.

FIG. 10 is a flowchart illustrating operations performed by an electronic device. In the following embodiment, each of operations may be performed sequentially, but may be not necessarily performed sequentially. For example, order of each of the operations may be changed, and at least two operations may be performed in parallel.

Referring to FIG. 10, at operation 1010, the processor 311 may activate a touch screen panel 316 and an electromagnetic inductive circuit 315. For example, while the electronic device 101 is in a default mode, the electronic device 101 may operate in a state that the touch screen panel 316 is activated and the electromagnetic inductive circuit 315 is deactivated. The processor 311 may activate the electromagnetic inductive circuit 315, based on identifying a designated input. As a non-limiting example, the designated input may include an input for activating an input function (e.g., a handwriting function) through a finger wearing the wearable device 200.

At operation 1020, the processor 311 may identify a first position on the display 312 where a portion of a body of a user is in contact, and identify a second position of the wearable device 200 worn on the portion of the body with respect to the display 312. The operation 1020 may correspond to the operation 610 of FIG. 6.

At operation 1030, the processor 311 may identify whether a distance between the first position and the second position is less than or equal to a reference distance. For example, in order to identify whether the wearable device 200 is worn on the portion of the body of the user in contact with the display 312, the processor 311 may identify whether the distance between the first position and the second position is less than or equal to the reference distance.

In a case that the distance between the first position and the second position exceeds the reference distance ("NO" at operation 1030), the processor 311 may perform the operation 1020 again. According to an embodiment, the processor 311 may perform a designated operation, based on identifying that the distance between the first position and the second position exceeds the reference distance. For example, the processor 311 may identify that the wearable device 200 is worn on another portion of the body of the user, based on identifying that the distance between the first position and the second position exceeds the reference distance. The processor 311 may perform an operation set according to a state that the wearable device 200 is worn on the other portion of the body of the user.

According to an embodiment, the processor 311 may learn information on a wearing position (or wearing state) of the wearable device 200. For example, the processor 311 may learn the information on the wearing position (or wearing state) of the wearable device 200, based on an input (e.g., a touch input) received from the user of the wearable device 200. For example, the processor 311 may learn an input received from at least one user (e.g., tester), based on crowd-sourcing. The processor 311 may train a designated prediction model (e.g., an AI model), based on the information on the wearing position (or wearing state) of the wearable device 200. The processor 311 may set input data of the prediction model to information (e.g., the first position or the second position) on the touch input with respect to the display 312. The processor 311 may identify the wearing position (or wearing state) of the wearable device 200, based on output data of the prediction model.

At operation 1040, in a case that the distance between the first position and the second position is less than or equal to the reference distance ("YES" at operation 1030), the processor 311 may set a display method of an object, based on an angle between the display 312 and the portion of the body. For example, the processor 311 may identify the angle between the display 312 and the portion of the body, based on identifying the distance between the first position and the second position is less than or equal to the reference distance. The processor 311 may set the display method of the object, based on the angle between the display 312 and the portion of the body.

For example, in a case that the portion of the body is a finger, the reference distance may change according to the user. Since a size of the hand and/or a length of the finger are different for each user, the reference distance may be changed according to the gender, age, the size of the hand, and/or the length of the finger of the user. An initial reference distance may be set to an average value (e.g., an average value for each country). For example, the reference distance may be set to 8 cm. According to an embodiment, the processor 311 may identify the length of the finger, and store the identified length of the finger, based on that a touch input occurs for the first time, through the finger where the wearable device 200 is worn. The processor 311 may identify the length of the finger, based on the initial touch input, and may set the reference distance, based on the length of the finger.

According to an embodiment, based on identifying that the angle between the display 312 and the portion of the body is less than a first angle (e.g., 30 degrees), the processor 311 may display an object based on a first display method (e.g., texture, thickness, color, pen type). Based on identifying that the angle between the display 312 and the portion of the body is greater than or equal to the first angle and less than a second angle (e.g., 60 degrees), the processor 311 may display an object based on a second display method (e.g., texture, thickness, color, pen type). Based on identifying that the angle between the display 312 and the portion of the body is greater than or equal to the second angle, the processor 311 may display an object based on a third display method (e.g., texture, thickness, color, pen type).

For example, the processor 311 may provide a handwriting function with a first thickness, based on identifying that the angle between the display 312 and the portion of the body is less than the first angle (e.g., 30 degrees). The processor 311 may provide the handwriting function with a second thickness thinner than the first thickness, based on identifying that the angle between the display 312 and the portion of the body is greater than or equal to the first angle (e.g., 30 degrees) and less than the second angle (e.g., 60 degrees). The processor 311 may provide the handwriting function with a third thickness thinner than the second thickness, based on identifying that the angle between the display 312 and the portion of the body is greater than or equal to a second angle (e.g., 60 degrees).

In the above-described embodiment, the thickness of the handwriting function is set according to (based on) the angle between the display 312 and the portion of the body. In some embodiments, based on the angle between the display 312 and the portion of the body, at least one of the type (e.g., a color pencil, a fountain pen, or a pencil) of the pen, the color, and/or the thickness with respect to the handwriting function may be changed.

In the above-described embodiment, an example in which the angle between display 312 and the portion of the body is identified as one of three sections has been described. In some embodiments, the angle between display 312 and the portion of the body may be identified as one of a plurality of sections. In some embodiments, the display method of the handwriting function may be changed in proportion to (or inversely proportional to) the angle between display 312 and the portion of the body.

According to an embodiment, the processor 311 may apply a weight to the angle between the display 312 and the portion of the body. For example, the weight may be set higher as the planar surface corresponding to the hole 270 of the wearable device 200 is closer to being parallel to the display 312. For example, the weight may be changed based on a user's age and/or a hand size. The processor 311 may identify a corrected angle by applying the weight to the identified angle. The processor 311 may set a display method of the object based on the corrected angle.

Figure 11:
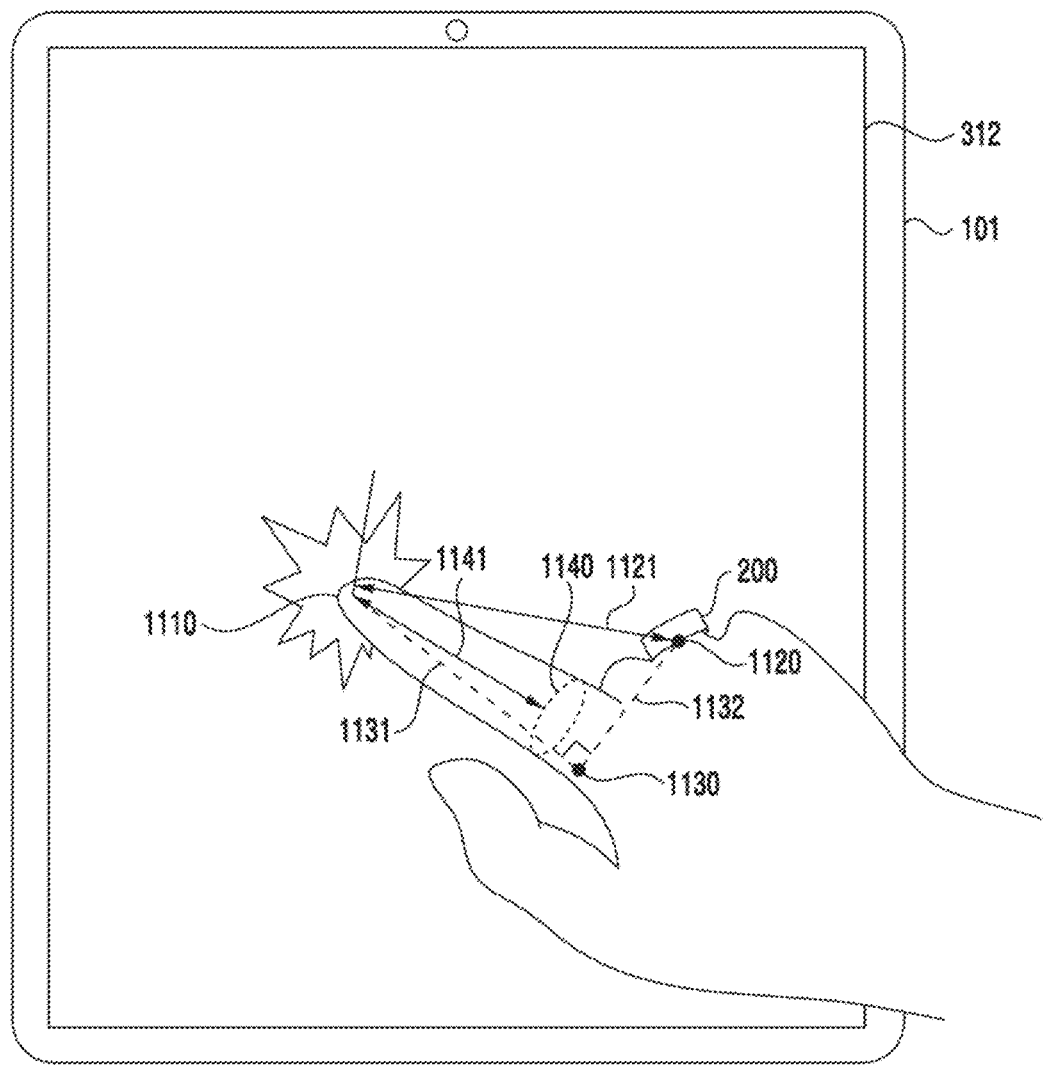
FIG. 11 illustrates an operation of an electronic device for identifying a wearing state of a wearable device.

FIG. 11 illustrates an operation of an electronic device for identifying a wearing state of a wearable device.

Referring to FIG. 11, a user of the electronic device 101 may provide a touch input on the display 312, using an index finger which does not wear a wearable device 200. The user of the electronic device 101 may be in a state that the wearable device 200 is worn on a ring finger.

The processor 311 may identify a position 1110 at which the touch input is identified on the display 312, using a touch screen panel 316. The processor 311 may identify a position 1120 of the wearable device 200, using an electromagnetic inductive circuit 315. The processor 311 may identify a position 1130 on the display 312 in which the position 1120 of the wearable device 200 is projected onto the display 312. The processor 311 may identify a distance 1131 from the position 1110 to the position 1130. The processor 311 may identify a distance 1132 from the position 1120 to the position 1130.

The processor 311 may identify a distance 1121 from the position 1110 to the position 1120, based on the distance 1131 and 1132. Based on identifying that the distance 1121 exceeds a reference distance, the processor 311 may identify that the wearable device 200 is worn on a finger distinguished from the finger which has performed the touch input. According to an embodiment, the processor 311 may identify the distance 1132 using the electromagnetic inductive circuit 315. Based on identifying that a signal level (e.g., value of an analog to digital converter (ADC)) identified using the electromagnetic inductive circuit 315 is less than or equal to a designated level, the processor 311 may identify that the distance 1121 is not a valid value, even within a distance at which it is determined that the finger is tilted.

According to an embodiment, the processor 311 may not perform an operation of changing a display method according to an angle between the display 312 and a portion of a body, based on identifying that the wearable device 200 is worn on a finger distinguished from the finger which has performed the touch input. However, the processor 311 may perform a set operation according to a state that the wearable device 200 is worn on another portion of the body of the user. According to an embodiment, based on a user setting, the processor 311 may perform the operation of changing the display method, according to the angle between the display 312 and the portion of the body even in state that the wearable device 200 is worn on the other portion of the body of the user. In this case, parameters (e.g., a reference distance) for identifying the angle between the display 312 and the portion of the body may be changed.

For example, the processor 311 may obtain information on operations (e.g., touch input, drawing, and writing) according to a wearing position of the wearable device 200. The processor 311 may store the obtained information in memory 313. The processor 311 may learn information on operations according to the wearing position of the wearable device 200. Based on the learned information, the processor 311 may pattern a size of the user's hand, a wearing pattern of the wearable device 200, or a direction (e.g., right or left hand) of the hand wearing the wearable device 200. The processor 311 may identify the position or a posture of the wearable device 200 based on at least one of the size of the user's hand, the wearing pattern of the wearable device 200, and/or the direction of the hand wearing the wearable device 200 (e.g., right or left hand). As described above, the processor 311 may provide a personalized function by learning the identified information, based on usage history of the user of the wearable device 200. The processor 311 may reduce an error and/or an execution error by providing the personalized function.

According to an embodiment, the reference distance may be set based on a length of the index finger. The length of the index finger may correspond to a distance 1141 from the position 1110 to a position 1140.

According to an embodiment, information on acceleration, information on angular velocity, and/or information on a wearing direction of the wearable device 200 may be additionally used, in order to accurately identify the position of the wearable device 200.

Figure 12:
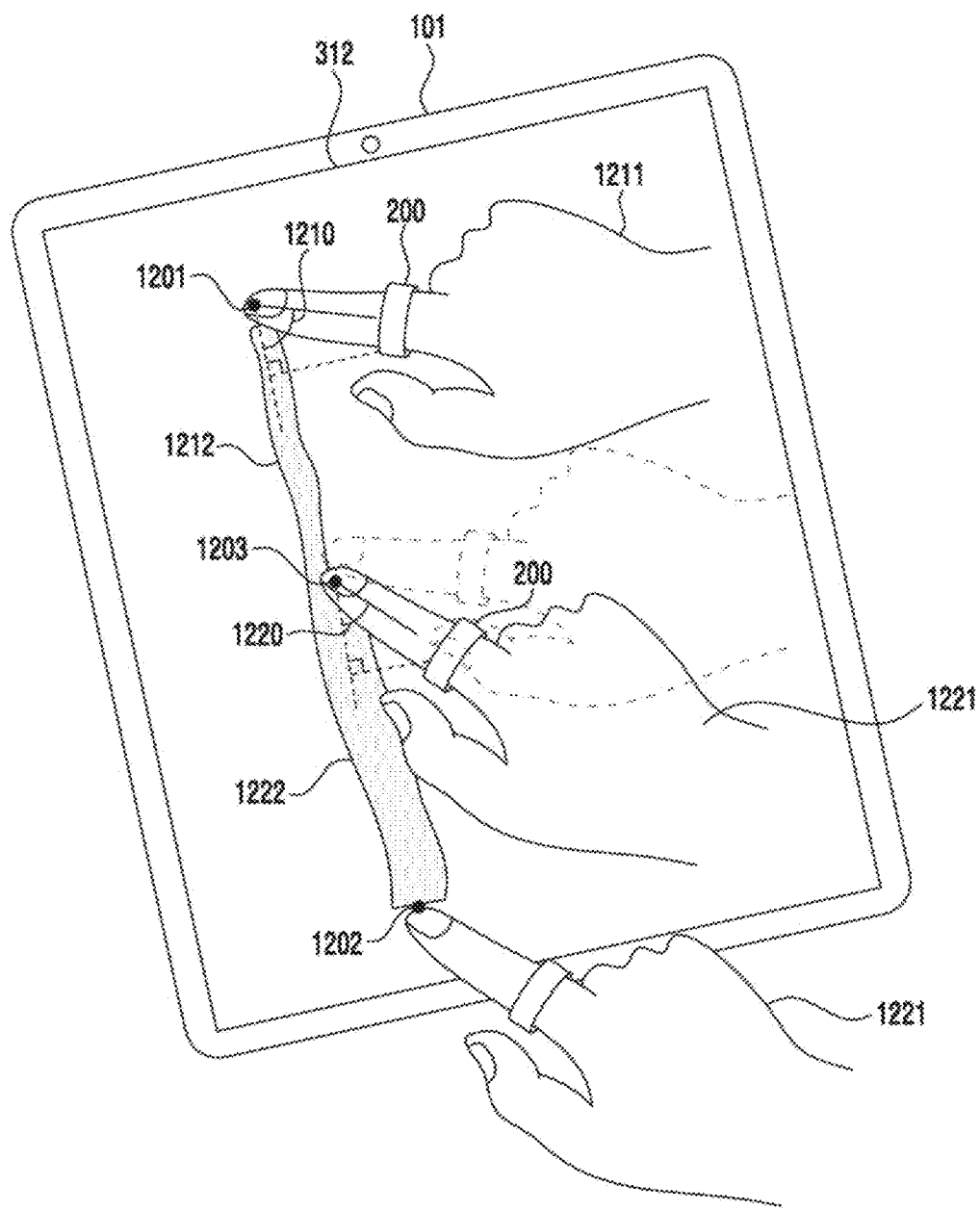
FIG. 12 illustrates an example in which a display method is changed according to an angle between a display and a portion of a body.

FIG. 12 illustrates an example in which a display method is changed according to an angle between a display and a portion of a body.

Referring to FIG. 12, the processor 311 may provide a handwriting function. The processor 311 may identify a touch input moving from a position 1201 to a position 1202, on the display 312. While the touch input is identified, an angle between the display 312 and a finger may be changed.

For example, the processor 311 may identify a start of the touch input at a position 1201 with a posture 1211. Based on identifying that the touch input starts at the position 1201, the processor 311 may identify an angle 1210 between the display 312 and the finger. The processor 311 may display an object 1212 having a first thickness (or a first texture, a first color) set based on a size of the angle 1210, along the touch input. The processor 311 may display the object 1212 having the first thickness from the position 1201 to a position 1203 according to the touch input.

In the position 1203, a posture of a portion of a body of a user may be changed from a posture 1211 to a posture 1221. In the position 1203, the processor 311 may identify the angle 1220 between display 312 and the finger. The processor 311 may identify that an angle between the display 312 and the finger is changed (or decreased) from the angle 1210 to the angle 1220. An object 1222 having a second thickness set based on a size of the angle 1220 may be displayed along to the touch input. The processor 311 may display the object 1222 having the second thickness from the position 1203 to the position 1202 along to the touch input. The processor 311 may provide a user experience similar to that of using an actual writing tool (e.g., a brush) by changing a display method of the handwriting function, based on the angle between the display 312 and the finger.

Figure 13:
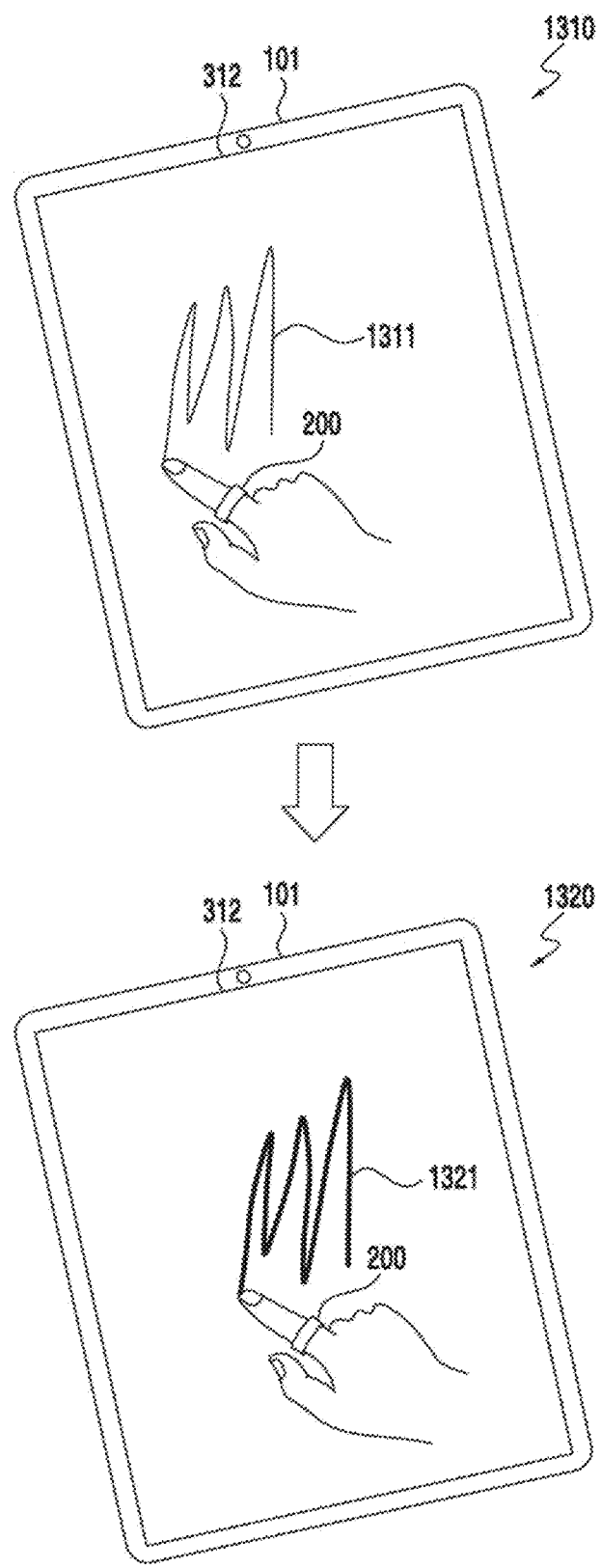
FIG. 13 illustrates an example in which a display method is changed according to an angle between a display and a portion of a body.

FIG. 13 illustrates an example in which a display method is changed according to an angle between a display and a portion of a body.

Referring to FIG. 13, the processor 311 may change a texture (e.g., thickness or density) of an object displayed through the display 312, based on an angle between the display 312 and a portion of a body of a user. For example, the processor 311 may identify a first angle between the display 312 and the portion of the body of the user. The processor 311 may display an object having a designated texture based on the first angle. For example, in case of displaying the object, based on a second angle distinguished from the first angle, the processor 311 may display an object having a texture different from the designated texture. According to an embodiment, the processor 311 may store the designated texture according to the first angle. After the designated texture according to the first angle is stored, in a case that the user displays another object based on the first angle again, the processor 311 may display the other object having the designated texture.

In an example 1310, the processor 311 may provide a handwriting function, while an angle between the display 312 and the portion of the body of the user is the first angle. The processor 311 may display an object 1311 having a first thickness on the display 312, based on a touch input of the portion of the body.

In an example 1320, the processor 311 may provide a handwriting function while an angle between display 312 and the portion of the body of the user is the second angle. The processor 311 may display an object 1321 having a second thickness thicker than the first thickness through display 312, based on a touch input of the portion of the body.

According to the example 1310 and the example 1320, the processor 311 may provide a handwriting function, based on displaying an object having a different texture according to an angle. Accordingly, the processor 311 may provide a user experience in which a texture of a pen (or pencil or fountain pen) is changed according to the angle. For example, a color pencil or a pencil has a characteristic of a side being worn out, such that it becomes thicker when used on one side. Accordingly, the processor 311 may not simply express it in a thick manner according to the angle. For example, the angle between the display 312 and the wearable device 200 for the user to perform the handwriting function may be stored. When the user performs the handwriting function again at the angle, the processor 311 may display the object thinner in a case that the user uses the side which is not worn out, according to a change in the angle.

In FIG. 13, an example in which the handwriting function is provided through the touch input is illustrated. In one embodiment, the processor 311 may provide the above-described functions even in the case of a hovering input.

According to an embodiment, the more actual color pencil or pencil is used, the more the side that is used wears away. Even when the actual color pencil or the actual pencil is used in the same direction, the thickness may be drawn differently. The processor 311 may change the thickness of the objects 1311 and 1321 even when the angle between the display 312 and the portion of the body of the user is maintained. The processor 311 may provide a user experience such as using an actual color pencil or an actual pencil by changing the thickness of the objects 1311 and 1321, even when the angle between the display 312 and the portion of the body of the user is maintained.

According to an embodiment, in a case that the portion of the body of the user is rotated, the processor 311 may set the thickness of the displayed object to be thin according to the touch input. The electronic device 101 may provide a user experience such as thinning the thickness, in a case that a surface which is not worn by rotating an actual color pencil or a pencil is used.

Figure 14A:
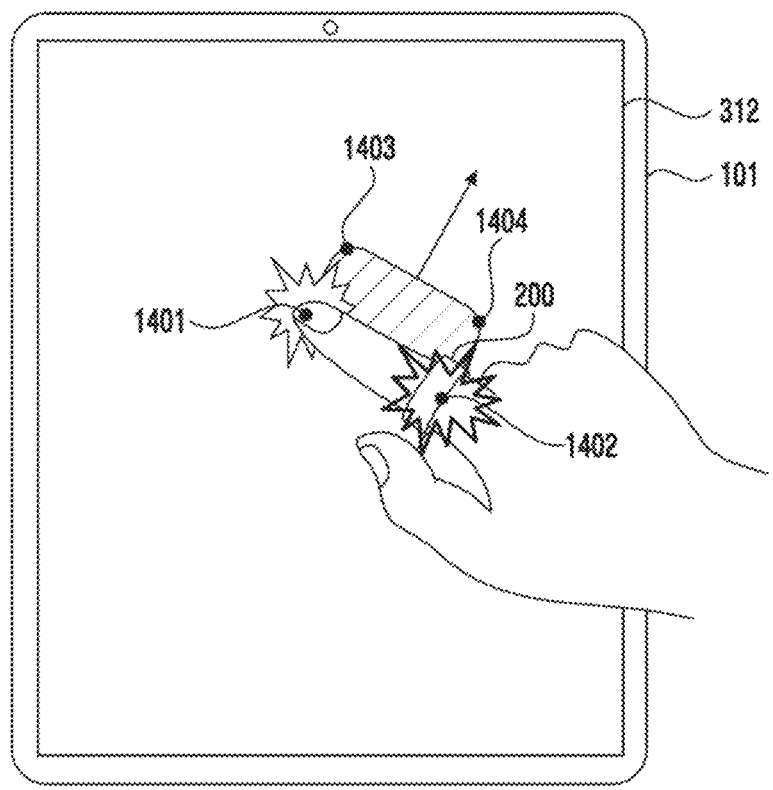
FIG. 14A illustrates an example of an operation of an electronic device according to an input with respect to a display.
Figure 14B:
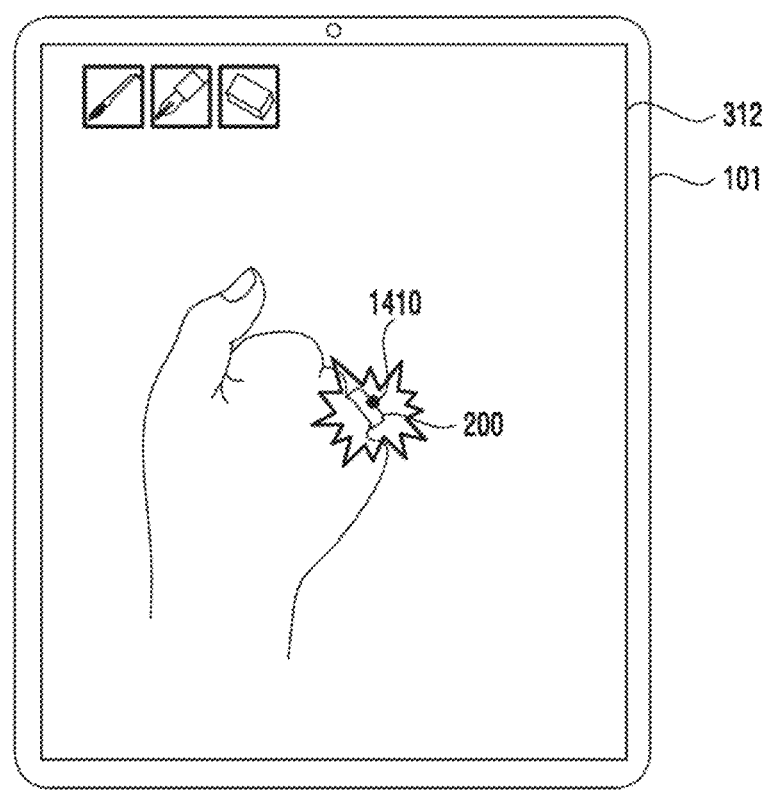
FIG. 14B illustrates an example of an operation of an electronic device according to an input with respect to a display.

FIG. 14A illustrates an example of an operation of an electronic device according to an input with respect to a display. FIG. 14B illustrates an example of an operation of an electronic device according to an input with respect to a display.

Referring to FIG. 14A, based on identifying that a portion of a body of a user is in contact with the display 312, the processor 311 may identify a position 1401 on the display 312, where the portion of the body of the user is in contact. The processor 311 may identify that a wearable device 200 is in contact with the display 312 together with the portion of the body. Based on identifying that the wearable device 200 is in contact with the display 312, the processor 311 may identify a position 1402 on the display 312, where the wearable device 200 is in contact. The processor 311 may identify that the wearable device 200 is in contact with the display 312 at the position 1402.

The processor 311 may identify that a position of the portion of the body of the user in contact with the display 312 is changed from the position 1401 to a position 1403, according to a movement of the portion of the body with respect to the electronic device 101. The processor 311 may identify that the position of the wearable device 200 in contact with the display 312 is changed from the position 1402 to a position 1404, according to the movement of the portion of the body with respect to the electronic device 101.

The processor 311 may identify an area configured, based on the position 1401, the position 1402, the position 1403, and the position 1404. The processor 311 may change a screen displayed on the display 312, based on the area configured through the position 1401, the position 1402, the position 1403, and the position 1404. For example, the processor 311 may perform various operations with respect to the configured area. For example, the processor 311 may perform at least one of an eraser function, a group selection, or an area designation, with respect to the configured area. For example, the processor 311 may enlarge or reduce the configured area (or an object included in the configured area).

For example, the processor 311 may perform an eraser operation with respect to the area. The processor 311 may remove a display of an object displayed in the area, based on the movement of the portion of the body of the user. The processor 311 may change an area for performing the eraser operation, based on the position where the portion of the body and the wearable device 200 is in contact with the display 312. For example, in a case that an eraser operation is performed using a touch input, it is difficult to erase a large area, and in a case that a size of the eraser corresponding to the touch input is increased, it is difficult to erase a detailed area, and thus there is an inconvenience that the user has to adjust the size of the eraser. Accordingly, in a case that the size of the eraser is adjusted, based on the area configured through the position 1401, the position 1402, the position 1403, and the position 1404, the user may easily change the size of the eraser.

Referring to FIG. 14B, the processor 311 may identify that the wearable device 200 is in contact with the display 312 at a position 1410. The processor 311 may identify that a portion of a body of a user is in a hovering state. The processor 311 may identify that only the wearable device 200 is in contact with the display 312. The processor 311 may perform a designated operation, based on identifying that the wearable device 200 is in contact with the display 312. For example, the processor 311 may remove a display of all objects displayed on the screen, based on identifying that the wearable device 200 is in contact with the display 312. For example, the processor 311 may change an expression method (e.g., a type of a pen) with respect to the handwriting function, based on identifying that the wearable device 200 is in contact with the display 312. For example, according to an order of the stored writing tools, the processor 311 may change the expression method (e.g., the type of the pen) with respect to the handwriting function, based on identifying that the wearable device 200 is in contact with the display 312. For example, the processor 311 may display a new page, based on identifying that the wearable device 200 is in contact with the display 312. For example, the processor 311 may display a new page for drawing a new drawing, based on identifying that the wearable device 200 is in contact with the display 312.

According to an embodiment, the processor 311 may identify a tapping input, based on identifying that the wearable device 200 is in contact with the display 312. The processor 311 may perform a designated function (e.g., an execution of an application), based on receiving the tapping input in a designated pattern (e.g., number of times or time interval).

In FIGS. 14A and 14B, an operation of the electronic device 101 is performed based on a portion of a body of a user, and/or the wearable device 200 being in contact with the display 312. In some embodiments, the operation performed based on the portion of the body of the user and/or the wearable device 200 being in contact with the display 312 may be changed (or set) by the user.

Figure 15A:
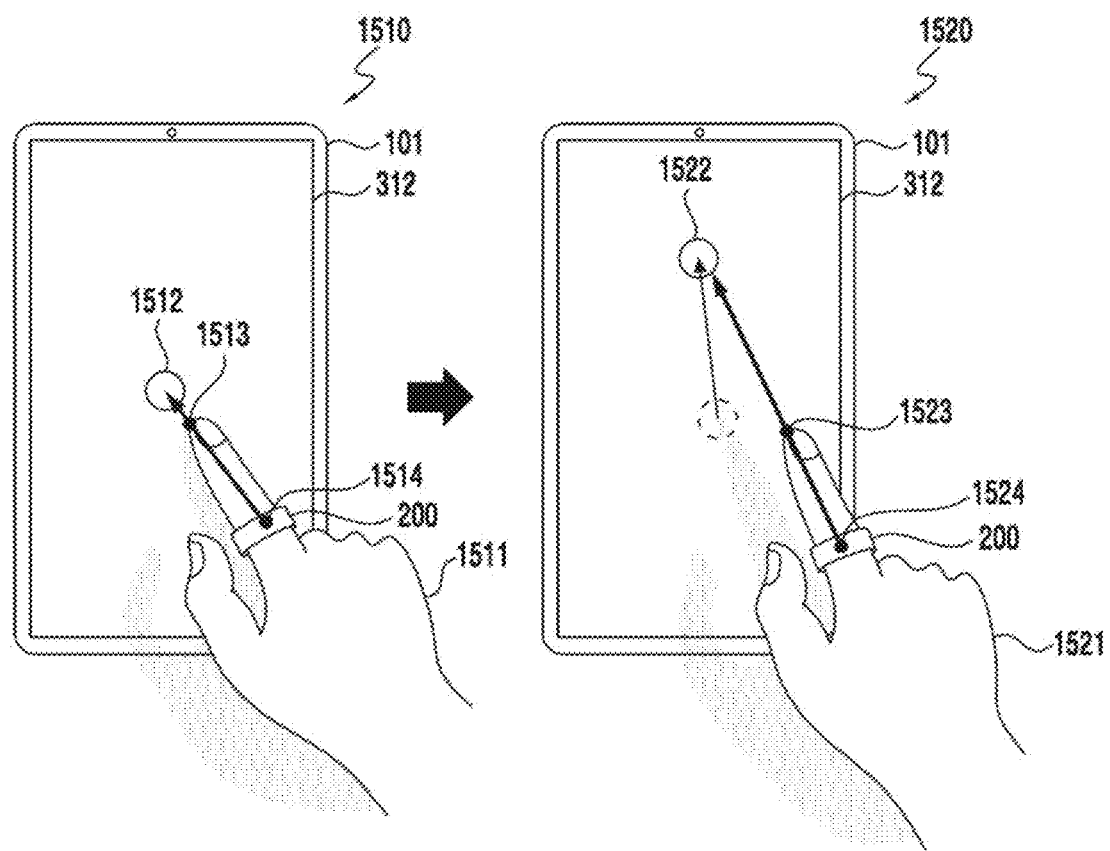
FIG. 15A illustrates an example of an operation of an electronic device according to an input with respect to a display.

FIG. 15A illustrates an example of an operation of an electronic device according to an input with respect to a display.

Referring to FIG. 15A, the processor 311 may identify a direction where a portion of a body (e.g., a finger) of a user is directed. The processor 311 may identify a position of the portion of the body of the user within a designated distance from the display 312, using a touch screen panel 316. The processor 311 may identify a hovering input, using the touch screen panel 316.

The processor 311 may identify a first position of the portion of the body (or a position of the finger) identified using the touch screen panel 316, and a second position of a wearable device 200 identified using an electromagnetic inductive circuit 315. The processor 311 may identify a direction where the portion of the body of the user is directed, based on the first position and the second position. The processor 311 may identify a position on the display 312 where the portion of the body of the user is directed, based on the direction where the portion of the body of the user is directed. For example, the processor 311 may display a pointer on a screen of the display 312, based on the identified position. For example, the processor 311 may identify an object corresponding to the identified position among at least one object displayed on the display 312. The processor 311 may perform an operation with respect to the identified object. For example, the processor 311 may perform an input with respect to the identified object.

In an example 1510, the processor 311 may identify a position of the portion of the body as a position 1513, while a posture of the portion of the body is a posture 1511. The processor 311 may identify a position of the wearable device 200 through a position 1514. Based on the position 1513 and the position 1514, the processor 311 may identify a position 1512 of the display 312 where the portion of the body (e.g., a finger) of the user is directed.

In an example 1520, a posture of the portion of the body may be changed from the posture 1511 to a posture 1521. The processor 311 may identify that the position of the portion of the body is changed from the position 1513 to a position 1523. The processor 311 may identify that the position of the wearable device 200 is changed to a position 1524. Based on the position 1523 and the position 1524, the processor 311 may identify a position 1522 of the display 312 where the portion of the body of the user is directed. The processor 311 may change the position of the object for indicating the position on the display 312 where the portion of the body of the user is directed from the position 1512 to the position 1522.

According to an embodiment, the processor 311 may provide an augmented reality (AR) service. The processor 311 may display a space (or an area) with respect to the augmented reality service through the display 312. The processor 311 may identify a position in the space, based on the direction where the portion of the body of the user is directed. The processor 311 may display an object (e.g., a pointer) indicating the point where the portion of the body of the user is directed in the space, based on the change in the direction where the portion of the body of the user is directed. According to an embodiment, the point where the portion of the body of the user is directed may correspond to a virtual object in the space. The processor 311 may perform an operation (e.g., search for the virtual object, display information on the virtual object) on the virtual object.

Figure 15B:
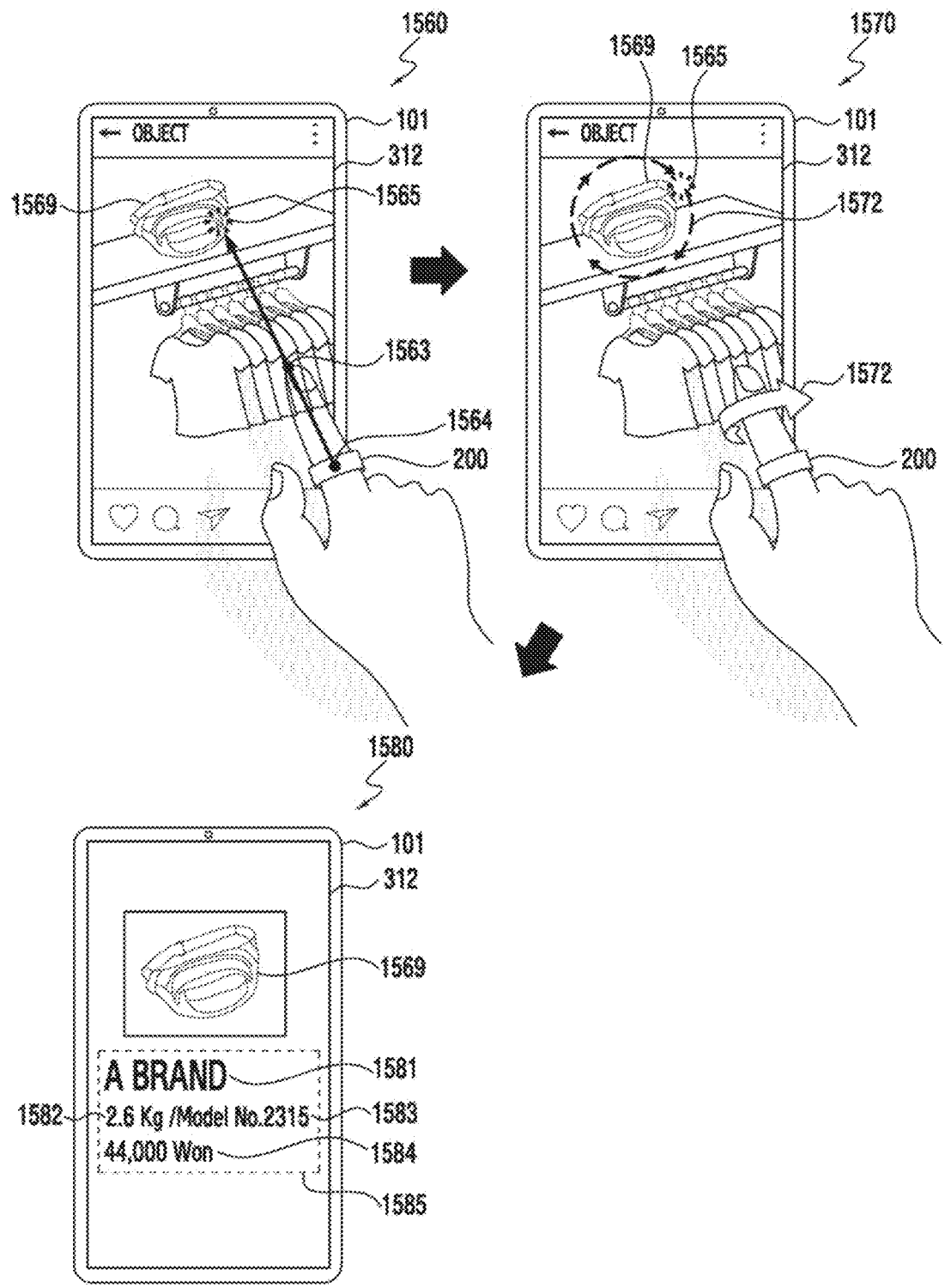
FIG. 15B illustrates an example of an operation of an electronic device according to an input with respect to a display.

FIG. 15B illustrates an example of an operation of an electronic device according to an input with respect to a display.

Referring to FIG. 15B, in an example 1560, in the same or similar manner as in the embodiment described in FIG. 15A, the processor 311 may identify a position 1563 of the portion of the body, using the touch screen panel 316, and may identify a position 1564 of the wearable device 200, using the electromagnetic inductive circuit 315. The processor 311 may identify a direction where the portion of the body of the user is directed, based on the position 1563 and the position 1564. The processor 311 may identify a position on the display 312, where the portion of the body of the user is directed, based on the direction where the portion of the body of the user is directed. The processor 311 may display a pointer 1565 at the position on the display 312 where the portion of the body of the user is directed. The processor 311 may change a position of the pointer 1565, based on a movement of the wearable device 200 (or a movement of the portion of the body of the user).

In an example 1570, the processor 311 may identify a first motion pattern where the position of the portion of the body of the user is changed. The processor 311 may identify that a pattern where the position of the portion of the body of the user is changed corresponds to a second motion pattern identified by the wearable device 200. The processor 311 may perform a designated function, based on identifying that the first motion pattern corresponds to the second motion pattern. The processor 311 may change the position of the pointer 1565, based on the first motion pattern (or the second motion pattern).

The processor 311 may identify that the portion of the body of the user moves along a direction 1572. The processor 311 may change the position displayed the pointer 1565, based on the direction 1572. The processor 311 may identify that the pointer 1565 selects an object 1569 displayed on the screen of the display 312. The processor 311 may identify the position of the pointer 1565, changed based on the direction 1572. The processor 311 may identify that an area (e.g., a circle) configured according to the change in the position of the pointer 1565, includes the object 1569. The processor 311 may identify that the object 1569 is selected.

In an example 1580, the processor 311 may perform an operation with respect to the object 1569, based on identifying that the object 1569 is selected. For example, the processor 311 may obtain information on the object 1569. The processor 311 may display the information on the object 1569, through the display 312. The processor 311 may display the information on the object 1569, in an area 1585. In a case that the object 1569 is a product, the processor 311 may display at least one of an object 1581 (or text) indicating a brand name, an object 1582 (or text) indicating a weight, an object 1583 (or text) indicating a model name, and/or an object 1584 (or text) indicating a price, in the area 1585.

FIG. 15B illustrates an example of providing shopping information for a selected object (e.g., the object 1569). In some embodiments, the processor 311 may provide a different function according to the selected object. For example, the processor 311 may display metadata for the selected object (or image). For example, the processor 311 may perform copying with respect to the selected object. For example, the processor 311 may perform a designated function (e.g., search, display shopping information, or scrap) with respect to the selected object.

Figure 16:
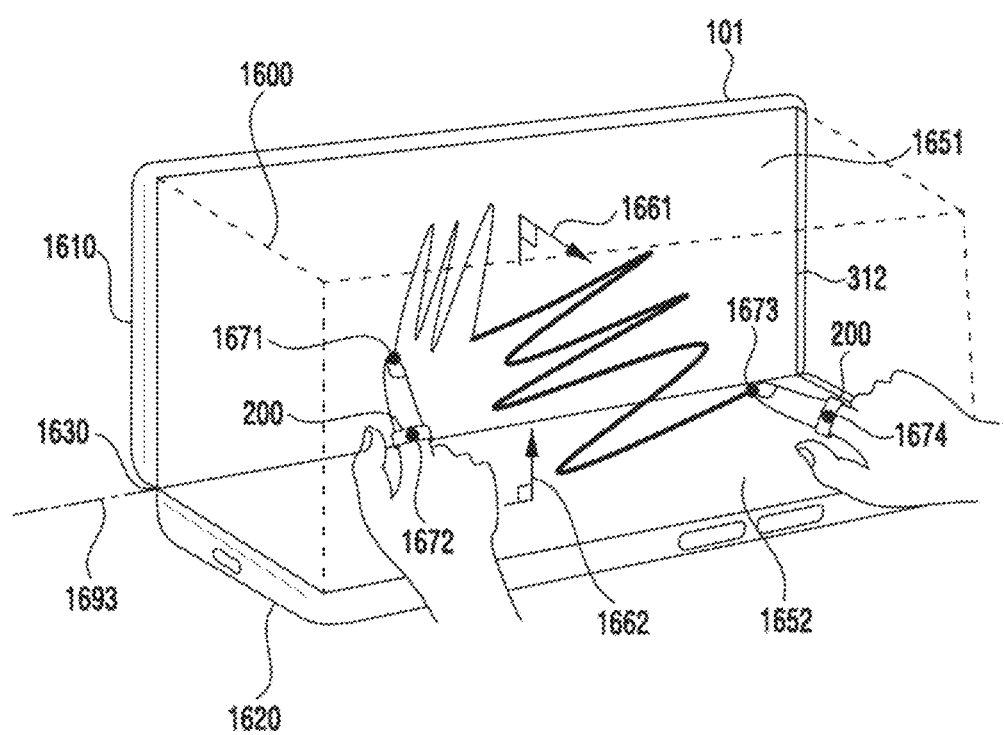
FIG. 16 illustrates an example of an operation of an electronic device according to an input with respect to a space (or an area)

FIG. 16 illustrates an example of an operation of an electronic device according to an input with respect to a space.

Referring to FIG. 16, the electronic device 101 may be a foldable device folded along a folding axis 1693. For example, the electronic device 101 may include a first housing 1610, a second housing 1620, and a hinge structure 1630. For example, the hinge structure 1630 may rotatably couple the first housing 1610 to the second housing 1620, based on the folding axis 1693.

In some embodiments, the display 312 may be folded along the folding axis 1693. The display 312 may be referred to as a flexible display. The display 312 may be divided into a first display area 1651 and a second display area 1652, based on the folding axis 1693. The first display area 1651 may correspond to a surface of the first housing 1610. The second display area 1652 may correspond to a surface of the second housing 1620.

According to an embodiment, the electronic device 101 may operate in a state that an angle between a first direction 1661 where the first display area 1651 is directed, and the second direction 1662 where the second display area 1652 is directed, is in a designated range. For example, the angle between the first direction 1661 and the second direction 1662 may be in the designated range.

For example, a space 1600 may be configured based on the first display area 1651 and the second display area 1652. According to an embodiment, a user of the electronic device 101 may identify the space 1600, by using a wearable device for providing an augmented reality (AR) service and/or a virtual reality (VR) service. The wearable device for providing the AR service and/or the VR service may display the space 1600 configured, based on the first display area 1651 and the second display area 1652.

The processor 311 may identify a hovering input, using at least one of a touch screen panel 316 and/or an electromagnetic inductive circuit 315. The processor 311 may identify a position of a portion of a body of the user in the space 1600, using at least one of the touch screen panel 316 and/or the electromagnetic inductive circuit 315. The processor 311 may identify a position of wearable device 200, using the electromagnetic inductive circuit 315.

For example, the processor 311 may identify the position of the portion of the body of the user, and the position of the wearable device 200, with respect to the first display area 1651. The processor 311 may identify the position of the portion of the body of the user, and the position of the wearable device 200 with respect to the second display area 1652. As the processor 311 identifies the position of the portion of the body of the user and the position of the wearable device 200 with respect to the first display area 1651 and the second display area 1652, accuracy of the position of the portion of the body of the user and the position of the wearable device 200 may be improved.

According to an embodiment, the processor 311 may identify a first position 1671 of the portion of the body of the user, and a second position 1672 of the wearable device 200. The processor 311 may identify a position relationship between one of the first display area 1651 and the second display area 1652 and the portion of the body.

For example, the processor 311 may identify a direction where the portion of the body is directed, based on the first position 1671 and the second position 1672. The processor 311 may identify one display area among the first display area 1651 and the second display area 1652, based on the direction where the portion of the body is directed. The processor 311 may identify a position relationship between the identified display area and the direction where the portion of the body is directed.

For example, based on identifying that the portion the body is directed the first display area 1651, the processor 311 may identify a position relationship (e.g., an angle) between the first display area 1651 and the direction where the portion of the body is directed. For example, based on identifying that the portion of the body is directed the second display area 1652, the processor 311 may identify a position relationship (e.g., an angle) between the second display area 1652 and the direction where the portion of the body is directed. According to an embodiment, in order to prevent an angle from rapidly changing according to a change of the display area for identifying the position relationship, the processor 311 may continuously change a display method even when the display area for identifying the position relationship is changed.

The processor 311 may identify that the position of the portion of the body is changed from the first position 1671 to a third position 1673 according to a movement of the portion of the body. The processor 311 may identify that the position of the wearable device 200 is changed from the second position 1672 to a fourth position 1674 according to the movement of the portion of the body. Based on the identified position relationship and the third position 1673 changed from the first position 1671, the processor 311 may transmit information, for displaying an object in the space 1600 configured based on the first display area 1651 and the second display area 1652, to the wearable device for providing the AR service and/or the VR service. The wearable device for providing the AR service and/or the VR service may display the object drawn according to the movement of the body of the user in the space 1600, based on the information obtained from the electronic device 101. An expression method of the object may be changed based on a position relationship between one display area among the first display area 1651 and the second display area 1652, and the portion of the body.

According to an embodiment, the processor 311 may store the information on the object configured in the space 1600 in memory 313. The processor 311 may output the object configured in the space 1600 through a 3D printer, by providing the stored information to the 3D printer.

According to an embodiment, the processor 311 may identify an input for indicating a timing at which the object starts to be drawn in the space 1600. For example, the processor 311 may identify the timing at which the object starts to be drawn in the space 1600 based on identifying a touch input to the wearable device 200. For example, in a case that the wearable device 200 is worn on an index finger, the touch input to the wearable device 200 through the thumb may be identified. Based on the identified touch input, the processor 311 may identify the timing at which the object starts to be drawn. According to an embodiment, the processor 311 may identify an input for indicating the timing at which drawing of the object ends in the space 1600. The processor 311 may identify the timing at which drawing of the object ends, based on identifying the touch input to the wearable device 200. For example, in a case that the wearable device 200 is worn on the index finger, the touch input to the wearable device 200 through the thumb may be identified. Based on the identified touch input, the processor 311 may identify the timing at which drawing of the object ends. According to an embodiment, the input for indicating the timing at which the object starts to be drawn and/or the input for indicating the timing at which drawing of an object ends may be variously set. For example, the input for indicating the timing at which the object starts to be drawn and/or the input for indicating the timing at which drawing of an object ends may include at least one of a voice input and/or a gesture input.

An example for configuring a space (or an area) using the electronic device 101 (or a plurality of electronic devices) will be described in FIGS. 17A and 17B.

Figure 17A:
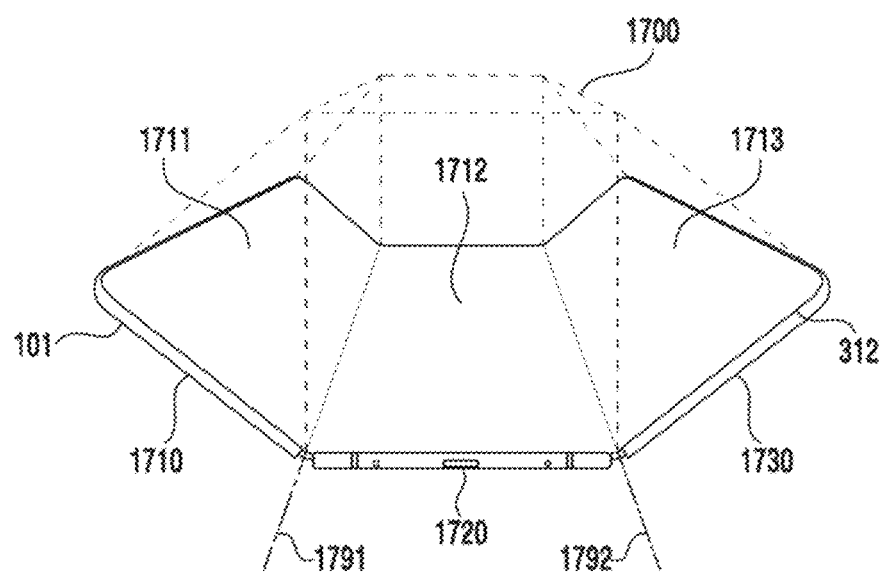
FIG. 17A illustrates an example of an operation of an electronic device for configuring a space.

FIG. 17A illustrates an example of an operation of an electronic device for configuring a space. FIG. 17B illustrates an example of an operation of an electronic device and an external electronic device for configuring a space.

Referring to FIG. 17A, the electronic device 101 may be a foldable device folded along two folding axes. For example, the electronic device 101 may include a first hinge structure which rotatably connects a first housing 1710, a second housing 1720, a third housing 1730, the first housing 1710, and the second housing 1720 with respect to the folding axis 1791, and a second hinge structure that rotatably connects the second housing 1720 and the third housing 1730 based on a folding axis 1792.

In some embodiments, the display 312 may be folded along the folding axis 1791 and the folding axis 1792. The display 312 may be referred to as a flexible display. The display 312 may be divided into a first display area 1711, a second display area 1712, and a third display area 1713, based on the folding axis 1791 and 1792. A first display area 1711 may correspond to a surface of the first housing 1710. A second display area 1712 may correspond to a surface of the second housing 1720. A third display area 1713 may correspond to a surface of the third housing 1730.

According to an embodiment, a space 1700 may be configured based on the first display area 1711, the second display area 1712, and the third display area 1713. A user of the electronic device 101 may identify the space 1700 by using the wearable device for providing an augmented reality (AR) service and/or a virtual reality (VR) service. The wearable device for providing the AR service and/or the VR service may display the space 1700 configured based on the first display area 1711, the second display area 1712, and the third display area 1713.

According to an embodiment, the operation of the electronic device 101 described in FIG. 16 may be performed in the space 1700.

Figure 17B:
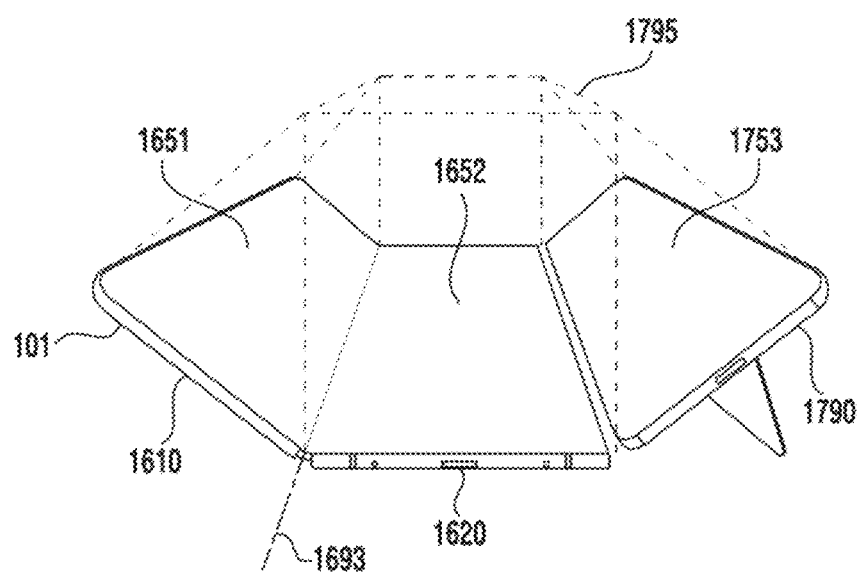
FIG. 17B illustrates an example of an operation of an electronic device and an external electronic device for configuring a space.

Referring to FIG. 17B, the electronic device 101 may correspond to the electronic device 101 of FIG. 16. The electronic device 101 and an external electronic device 1790 may be used to configure a space 1795. A display of an external electronic device 1790 may include a display area 1753.

According to an embodiment, an edge area of a second housing 1620 of the electronic device 101 may be in contact with an edge area of a housing of the external electronic device 1790. Based on a first display area 1651, a second display area 1652 of the electronic device 101, and a display area 1753 of the external electronic device 1790, a space 1795 may be configured.

The user of the electronic device 101 may identify the space 1795, by using a wearable device for providing an augmented reality (AR) service and/or a virtual reality (VR) service. The wearable device for providing the AR service and/or the VR service may display the space 1795 configured based on the first display area 1651, the second display area 1652 of the electronic device 101, and the display area 1753 of the external electronic device 1790.

FIG. 17B illustrates an example of configuring a space using two electronic devices is illustrated in FIG. 17B. In some embodiments, the space may be configured through various types of electronic devices.

Referring to FIGS. 17A and 17B, the space 1700 and the space 1795 may be configured through the electronic device 101 and/or the external electronic device 1790. The space 1700 and the space 1795 may be configured to perform the same or similar input as to FIG. 16. For example, the processor 311 may transmit information for displaying an object in the spaces 1700 and 1795 to a wearable device for providing an AR service and/or a VR service according to a movement of the portion of the body of the user wearing the wearable device 200 in the space 1700 and the space 1795.

According to an embodiment, an electronic device (e.g., the electronic device 101) may comprise a display (e.g., the display 312) comprising an electromagnetic inductive circuit (e.g., the electromagnetic inductive circuit 315) and a touch screen panel (e.g., the touch screen panel 316), memory (e.g., memory 313) storing one or more instructions, comprising one or more storage media, and at least one processor (e.g., processor 311) comprising processing circuitry. The instructions, when executed by the at least one processor individually or collectively, may cause the electronic device to, based on identifying that a portion of a body of a user is in contact with the display, identify a first position on the display, where the portion of the body is contacted, and identify a second position of a wearable device worn on the portion of the body, with respect to the display. The instructions, when executed by the at least one processor individually or collectively, may cause the electronic device to, based on the first position and the second position, identify a position relationship between the display and the portion of the body. The instructions, when executed by the at least one processor individually or collectively, may cause the electronic device to identify that a position of the portion of the body which is in contact with the display is changed from the first position to a third position, according to a movement of the portion of the body with respect to the electronic device. The instructions, when executed by the at least one processor individually or collectively, may cause the electronic device to, based on the position relationship and the third position changed from the first position, change a screen displayed on the display.

According to an embodiment, the instructions, when executed by the at least one processor individually or collectively, cause the electronic device to, while the touch screen panel is activated and the electromagnetic inductive circuit is inactivated, identify an input for activating the electromagnetic inductive circuit. The instructions, when executed by the at least one processor individually or collectively, may cause the electronic device to, based on the input, activate the electromagnetic inductive circuit.

According to an embodiment, the instructions, when executed by the at least one processor individually or collectively, cause the electronic device to, based on the input, transmit a signal to cause the wearable device to provide power to at least one circuit comprised in the wearable device. The instructions, when executed by the at least one processor individually or collectively, may cause the electronic device to, based on that the power is provided to the at least one circuit, identify the second position of the wearable device with respect to the display using the electromagnetic inductive circuit.

According to an embodiment, the instructions, when executed by the at least one processor individually or collectively, cause the electronic device to, while the power being provided to the at least one circuit, identify, using the touch screen panel, that the portion of the body is in contact with the display.

According to an embodiment, the at least one circuit may comprise a first circuit and a second circuit. The first circuit may be disposed in the wearable device to generate a magnetic field in a first direction at a designated point relative to the wearable device. The second circuit may be disposed in the wearable device to generate a magnetic field in a second direction perpendicular to the first direction, at the designated point relative to the wearable device.

According to an embodiment, The instructions, when executed by the at least one processor individually or collectively, may cause the electronic device to identify that a distance between the first position and the second position is less than or equal to a reference distance. The instructions, when executed by the at least one processor individually or collectively, may cause the electronic device to, based on identifying that the distance between the first position and the second position is less than or equal to the reference distance, identify the position relationship between the display and the portion of the body.

According to an embodiment, the instructions, when executed by the at least one processor individually or collectively, may cause the electronic device to, based on identifying that a distance between the first position and the second position is greater than a reference distance, identify that the wearable device is worn on another portion of the body.

According to an embodiment, the position relationship may comprise an angle between the display and the portion of the body. The instructions, when executed by the at least one processor individually or collectively, may cause the electronic device to display, based on the angle, a visual object corresponding to the third position changed from the first position, on the screen.

According to an embodiment, the instructions, when executed by the at least one processor individually or collectively, may cause the electronic device to display the visual object with a thickness which is set based on the angle, on the screen.

According to an embodiment, the instructions, when executed by the at least one processor individually or collectively, may cause the electronic device to identify that the wearable device is in contact with the display at the second position. The instructions, when executed by the at least one processor individually or collectively, may cause the electronic device to identify that the position of the wearable device in contact with the display changes from the second position to a fourth position according to the movement of the portion of the body with respect to the electronic device. The instructions, when executed by the at least one processor individually or collectively, may cause the electronic device to change the screen displayed on the display, based on an area configured based on the first position, the second position, the third position, and the fourth position.

According to an embodiment, the instructions, when executed by the at least one processor individually or collectively, may cause the electronic device to identify a fourth position on the display to which the portion of the body of the user is directed. The instructions, when executed by the at least one processor individually or collectively, may cause the electronic device to identify an object corresponding to the fourth position among at least one objects displayed through the display. The instructions, when executed by the at least one processor individually or collectively, may cause the electronic device to perform an operation with respect to the identified object.

According to an embodiment, an electronic device may comprise a first housing, a second housing, a hinge structure rotatably coupling the first housing to the second housing with respect to a folding axis, a flexible display including a first display area corresponding to one side of the first housing and a second display area corresponding to one side of the second housing divided based on the folding axis, and including at least one of an electromagnetic inductive circuit and a touch screen panel, memory (e.g., memory 313) storing one or more instructions, comprising one or more storage media, and at least one processor (e.g., processor 311) comprising processing circuitry. The instructions, when executed by the at least one processor individually or collectively, may cause the electronic device to identify an approach of a portion of a body of a user and a wearable device worn on the portion of the body while an angle between a direction in which the first display area faces and a direction in which the second display area faces is within a designated range. The instructions, when executed by the at least one processor individually or collectively, may cause the electronic device to identify a first position of the portion of the body and a second position of the wearable device, with respect to the display. The instructions, when executed by the at least one processor individually or collectively, may cause the electronic device to, based on the first position and the second position, identify a position relationship between one display area of the first display area and the second display area and the portion of the body. The instructions, when executed by the at least one processor individually or collectively, may cause the electronic device to identify that the position of the portion of the body changes from the first position to a third position according to a movement of the portion of the body with respect to the electronic device. The instructions, when executed by the at least one processor individually or collectively, may cause the electronic device to, based on the position relationship and the third position changed from the first position, transmit information for displaying an object in a space configured based on the first display area and the second display area to another wearable device.

According to an embodiment, the instructions, when executed by the at least one processor individually or collectively, may cause the electronic device to identify the one display area of the first display area and the second display area based on a direction in which the portion of the body faces.

According to an embodiment, a method of an electronic device may comprise, based on identifying that a portion of a body of a user is in contact with a display of the electronic device, identifying a first position on the display, where the portion of the body is contacted and identifying a second position of a wearable device worn on the portion of the body, with respect to the display. The method may comprise, based on the first position and the second position, identifying a position relationship between the display and the portion of the body. The method may comprise identifying that a position of the portion of the body which is in contact with the display is changed from the first position to a third position according to a movement of the portion of the body with respect to the electronic device. The method may comprise, based on the position relationship and the third position changed from the first position, changing a screen displayed on the display.

According to an embodiment, the method may comprise, while a touch screen panel is activated and an electromagnetic inductive circuit is inactivated, identifying an input for activating the electromagnetic inductive circuit. The method may comprise, based on the input, activating the electromagnetic inductive circuit.

According to an embodiment, the method may comprise, based on the input, transmitting a signal to cause the wearable device to provide power to at least one circuit comprised in the wearable device. The method may comprise, based on that the power is provided to the at least one circuit, identifying the second position of the wearable device with respect to the display using the electromagnetic inductive circuit.

According to an embodiment, the method may comprise, while the power is provided to the at least one circuit, identifying, using the touch screen panel, that the portion of the body is in contact with the display.

According to an embodiment, the at least one circuit may comprise a first circuit and a second circuit. The first circuit may be disposed in the wearable device to generate a magnetic field in a first direction at a designated point relative to the wearable device. The second circuit may be disposed in the wearable device to generate a magnetic field in a second direction perpendicular to the first direction, at the designated point relative to the wearable device.

According to an embodiment, the method may comprise identifying that a distance between the first position and the second position is less than or equal to a reference distance. The method may comprise, based on identifying that the distance between the first position and the second position is less than or equal to the reference distance, identifying the position relationship between the display and the portion of the body.

According to an embodiment, a non-transitory computer readable storage medium may store one or more programs. The one or more programs may comprise instructions, which, when being executed by at least one processor of an electronic device with a display comprising an electromagnetic inductive circuit and a touch screen panel, may cause the electronic device to, based on identifying that a portion of a body of a user is in contact with the display, identify a first position on the display, where the portion of the body is contacted and identify a second position of a wearable device worn on the portion of the body, with respect to the display. The one or more programs may comprise instructions, which, when executed by the at least one processor, cause the electronic device to, based on the first position and the second position, identify a position relationship between the display and the portion of the body. The one or more programs may comprise instructions, which, when executed by the at least one processor, cause the electronic device to identify that a position of the portion of the body which is in contact with the display is changed from the first position to a third position according to a movement of the portion of the body with respect to the electronic device. The one or more programs may comprise instructions, which, when executed by the at least one processor, cause the electronic device to, based on the position relationship and the third position changed from the first position, change a screen displayed on the display.

According to an embodiment, when identifying a touch input through a user's finger, a processor of an electronic device may identify an angle of the finger with respect to a display using a wearable device worn on the finger. The electronic device may change a display method (e.g., texture, width, thickness, or intensity) for a handwriting function based on the angle of the finger with respect to the display. The electronic device may provide a different handwriting experience according to the angle of the user's finger with respect to the display.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. An electronic device comprising:
a display comprising an electromagnetic inductive circuit and a touch screen panel;
memory storing one or more instructions, comprising one or more storage media; and
at least one processor comprising processing circuitry,
wherein the instructions, when executed by the at least one processor individually or collectively, cause the electronic device to:
based on identifying that a portion of a body of a user is in contact with the display:
identify a first position on the display, the portion of the body being contacted to the first position, and
with respect to the display, identify a second position of a wearable device worn on the portion of the body,
based on the first position and the second position, identify a position relationship between the display and the portion of the body,
identify that a position of the portion of the body which is in contact with the display is changed from the first position to a third position, based on a movement of the portion of the body with respect to the electronic device, and based on the position relationship and the third position, which is changed from the first position, change a screen displayed on the display.

2. The electronic device of claim 1, wherein the instructions, when executed by the at least one processor individually or collectively, cause the electronic device to:

while the touch screen panel is activated and the electromagnetic inductive circuit is inactivated, identify an input for activating the electromagnetic inductive circuit, and based on the input for activating the electromagnetic inductive circuit, activate the electromagnetic inductive circuit.

3. The electronic device of claim 2, wherein the instructions, when executed by the at least one processor individually or collectively, cause the electronic device to:

based on the input for activating the electromagnetic inductive circuit, transmit a signal to cause the wearable device to provide power to at least one circuit of the wearable device, and based on the power provided to the at least one circuit, identify, using the electromagnetic inductive circuit, the second position of the wearable device with respect to the display.

4. The electronic device of claim 3, wherein the instructions, when executed by the at least one processor individually or collectively, cause the electronic device to, based on the power provided to the at least one circuit, identify, using the touch screen panel, that the portion of the body is in contact with the display.

5. The electronic device of claim 4, wherein the at least one circuit comprises a first circuit and a second circuit, wherein the first circuit is disposed in the wearable device and is configured to generate a magnetic field in a first direction at a designated point relative to the wearable device, and wherein the second circuit is disposed in the wearable device and is configured to generate the magnetic field in a second direction perpendicular to the first direction, at the designated point relative to the wearable device.

6. The electronic device of claim 1, wherein the instructions, when executed by the at least one processor individually or collectively, cause the electronic device to:

identify that a distance between the first position and the second position is less than or equal to a reference distance, and based on identifying that the distance between the first position and the second position is less than or equal to the reference distance, identify the position relationship between the display and the portion of the body.

7. The electronic device of claim 1, wherein the instructions, when executed by the at least one processor individually or collectively, cause the electronic device to, based on identifying that a distance between the first position and the second position is greater than a reference distance, identify that the wearable device is worn on another portion of the body.

8. The electronic device of claim 1, wherein the position relationship comprises an angle between the display and the portion of the body, and wherein the instructions, when executed by the at least one processor individually or collectively, cause the electronic device to, based on the angle, display, on the screen, a visual object corresponding to the third position changed from the first position.

9. The electronic device of claim 8, wherein the instructions, when executed by the at least one processor individually or collectively, cause the electronic device to display, on the screen, the visual object with a thickness that is set based on the angle.

10. The electronic device of claim 1, wherein the instructions, when executed by the at least one processor individually or collectively, cause the electronic device to:

identify that the wearable device is in contact with the display at the second position, identify that the position of the wearable device in contact with the display changes from the second position to a fourth position based on the movement of the portion of the body with respect to the electronic device, and change the screen displayed on the display, based on an area configured based on the first position, the second position, the third position, and the fourth position.

11. The electronic device of claim 1 wherein the instructions, when executed by the at least one processor individually or collectively, cause the electronic device to:

identify a fourth position on the display to which the portion of the body of the user is directed, identify an object corresponding to the fourth position among at least one objects displayed through the display, identify a movement of the object changed based on the movement of the portion of the body of the user, identify a visual object in an area configured based on the movement of the object, and display a screen for providing information on the identified visual object.

12. A method of an electronic device, the method comprising:

based on identifying that a portion of a body of a user is in contact with a display of the electronic device:

identifying a first position on the display, the first position being connected to the portion of the body, and with respect to the display, identifying a second position of a wearable device worn on the portion of the body, based on the first position and the second position, identifying a position relationship between the display and the portion of the body, identifying that a position of the portion of the body which is in contact with the display is changed from the first position to a third position based on a movement of the portion of the body with respect to the electronic device, and based on the position relationship and the third position, which is changed from the first position, changing a screen displayed on the display.

13. The method of claim 12, further comprising:

while a touch screen panel of the display is activated and an electromagnetic inductive circuit of the display is inactivated, identifying an input for activating the electromagnetic inductive circuit, and based on the input for activating the electromagnetic inductive circuit, activating the electromagnetic inductive circuit.

14. The method of claim 13, further comprising:

based on the input for activating the electromagnetic inductive circuit, transmitting a signal to cause the wearable device to provide power to at least one circuit of the wearable device, and based on the power provided to the at least one circuit, identifying, using the electromagnetic inductive circuit, the second position of the wearable device, with respect to the display.

15. The method of claim 14, further comprising, based on the power provided to the at least one circuit, identifying, using the touch screen panel, that the portion of the body is in contact with the display.

16. The method of claim 15, wherein the at least one circuit comprises a first circuit and a second circuit,
wherein the first circuit is disposed in the wearable device and is configured to generate a magnetic field in a first direction at a designated point relative to the wearable device, and
wherein the second circuit is disposed in the wearable device and is configured to generate the magnetic field in a second direction perpendicular to the first direction, at the designated point relative to the wearable device.

17. The method of claim 12, further comprising:
identifying that a distance between the first position and the second position is less than or equal to a reference distance, and
based on identifying that the distance between the first position and the second position is less than or equal to the reference distance, identifying the position relationship between the display and the portion of the body.

18. The method of claim 12, further comprising, based on identifying that a distance between the first position and the second position is greater than a reference distance, identifying that the wearable device is worn on another portion of the body.

19. The method of claim 12, further comprising, based on the angle, displaying, on the screen, a visual object corresponding to the third position changed from the first position.

20. A non-transitory computer readable storage medium storing one or more programs, the one or more programs comprising instructions, which, when being executed by at least one processor of an electronic device with a display comprising an electromagnetic inductive circuit and a touch screen panel, cause the electronic device to:
based on identifying that a portion of a body of a user is in contact with the display,
identify a first position on the display, the first position being connected to the portion of the body, and
with respect to the display, identify a second position of a wearable device worn on the portion of the body,
based on the first position and the second position, identify a position relationship between the display and the portion of the body,
identify that a position of the portion of the body which is in contact with the display is changed from the first position to a third position based on a movement of the portion of the body with respect to the electronic device, and
based on the position relationship and the third position, which is changed from the first position, change a screen displayed on the display.

* * * * *